INVENTOR.
Pierre Louis Marie LE GALL
BY C. A. Gulbrandsen
Atty.

Dec. 26, 1961 P. L. M. LE GALL 3,015,092

PLATE MEMORY AND MAGNETIC MATERIAL

Filed March 30, 1959 17 Sheets-Sheet 3

Dec. 26, 1961 P. L. M. LE GALL 3,015,092

PLATE MEMORY AND MAGNETIC MATERIAL

Filed March 30, 1959 17 Sheets-Sheet 10

PLATE MEMORY AND MAGNETIC MATERIAL

Filed March 30, 1959 17 Sheets-Sheet 11

Dec. 26, 1961 P. L. M. LE GALL 3,015,092

PLATE MEMORY AND MAGNETIC MATERIAL

Filed March 30, 1959 17 Sheets-Sheet 13

PLATE MEMORY AND MAGNETIC MATERIAL

United States Patent Office 3,015,092

Patented Dec. 26, 1961

3,015,092

PLATE MEMORY AND MAGNETIC MATERIAL

Pierre Louis Marie Le Gall, St. Cloud, France, assignor to Automatic Electric Laboratories, Inc., a corporation of Delaware Filed Mar. 30, 1959, Ser. No. 802,685
Claims priority, application France Apr. 12, 1958
15 Claims. (Cl. 340—174)

The present invention relates to binary memories intended to be connected to an electronic calculator for example, and more particularly to memories of the magnetic type utilizing the known techniques of plates of magnetic material pierced with holes and characterized by a substantially rectangular hysteresis cycle.

The object of the invention is a rapid reading memory of the parallel type of large capacity, capable of using magnetic materials of mediocre qualities with respect to their homogeneity and the rectangularity of their hysteresis cycle, and having the property of blocking itself upon the appearance of an error, thus avoiding accidental destruction of the recorded information.

Elementary memories are known comprising a pair of plates pierced with holes facing one another in pairs. Each hole is traversed by an exciting wire and a reading wire. There is an exciting wire for each pair of holes and a reading wire for each pair of plates. The magnetization in opposite senses of a pair of holes permits the storage of a binary digit. The passage of a first impulse in the exciting wire causes a reversal in one of the holes, which produces an impulse in the reading wire, the polarity of which depends on the stored binary digit. The inscription of a digit in a particular pair of holes is obtained by passing in the corresponding exciting wire a second impulse of an amplitude equal to the first but of opposite polarity, which tends to cause reversal of the two holes of the pair. An inhibition impulse of appropriate polarity on the reading wire has for effect to prevent the reversal of one of the holes of the pair involved. The inhibition impulse has a magnitude insufficient to cause the reversal of the pairs of holes not involved; it has usually an amplitude one-half that of the impulses sent over the exciting wire.

Memory elements are known comprising a stack-up of elementary memories of the type in which the network of exciting wires traverses in succession all of the pairs of plates of that element. The passage of an exciting impulse in an exciting wire reverses all of the pairs of holes which this wire traverses. An inscription or a reinscription is thereupon effected. In memory elements of the type known to the prior art, the number of pairs of plates threaded by the same network of exciting wires does not exceed 10 or 20, since the usual method of feeding the exciting wires does not lend itself to high speed of access.

According to another feature of the invention, several memory elements of this type are threaded on the same network of exciting wires, in order to form words having large number of digits, or to place several words in series on the same exciting wire. The placing in series of several memory elements in this manner is made possible by a special arrangement of the element for feeding the exciting wires. This element has been given the general name of access matrix. The particular arrangement of the access matrix is also a feature of the invention.

According to this feature the access matrix, comprising a reading sub-matrix and a reinscription sub-matrix, is provided with two diodes for each exciting wire (one diode per sub-matrix), which arrangement permits the activation of a predetermined exciting wire by means of a single transistor per line and a single transistor per column of the matrix, from which there results an appreciable economy in costs and in dimensions.

The described arrangement permitting the placing of several categories of words in series on the same network of exciting wires, a central device for reading, writing, and selection of the word category has for effect to activate the category of words involved.

The complete memory of the invention is broken down into standard units, which permits modifying the capacity at will without modifying the structure of each unit.

According to a feature of the invention the method for detecting errors consists in making certain at each reading that an impulse is furnished. The absence of a reading impulse of positive or negative polarity initiates the blocking of any subsequent operation, hence all subsequent extraction of information. A centralizing device permits the identification of the unit at fault.

According to another feature of the invention the second impulse sent over the exciting wire for inscription or reinscription has an amplitude equal to three fourths of that of the first impulse, and the inhibition impulse sent over the reading wire has an amplitude equal to one fourth that of the first impulse. This feature permits the usage for the magnetic plates of material whose hysteresis cycle is only moderately rectangular.

The invention will be better understood upon the reading of the detailed description which follows and the examination of the figures and drawings annexed in which.

Figure 3:
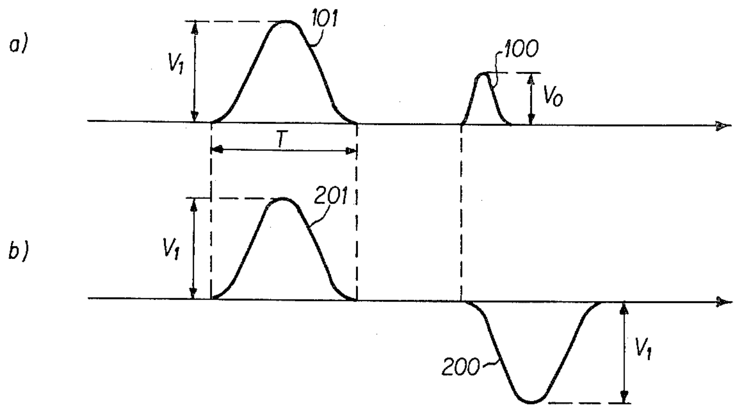
Figure 4:
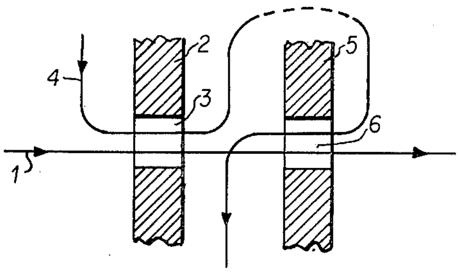
Figure 5:
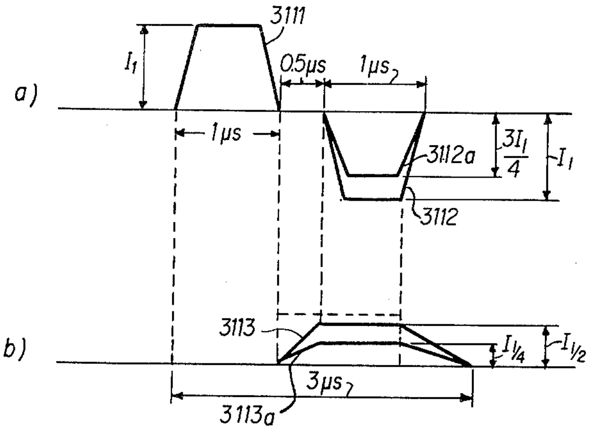
Figure 6:
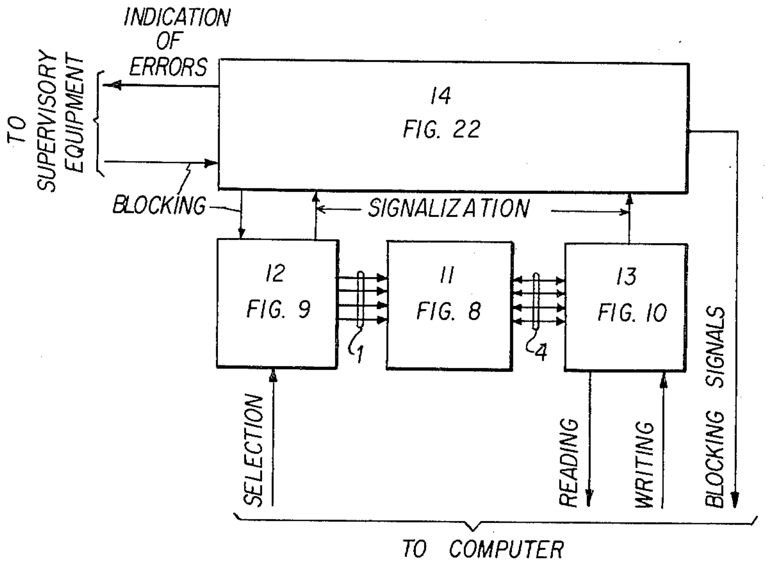
Figure 7:
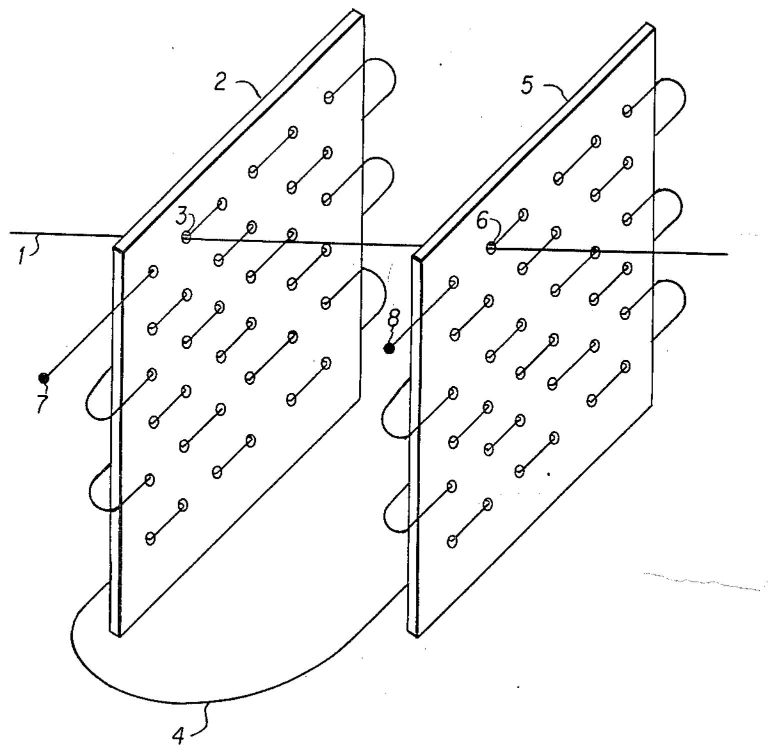
Figure 8:
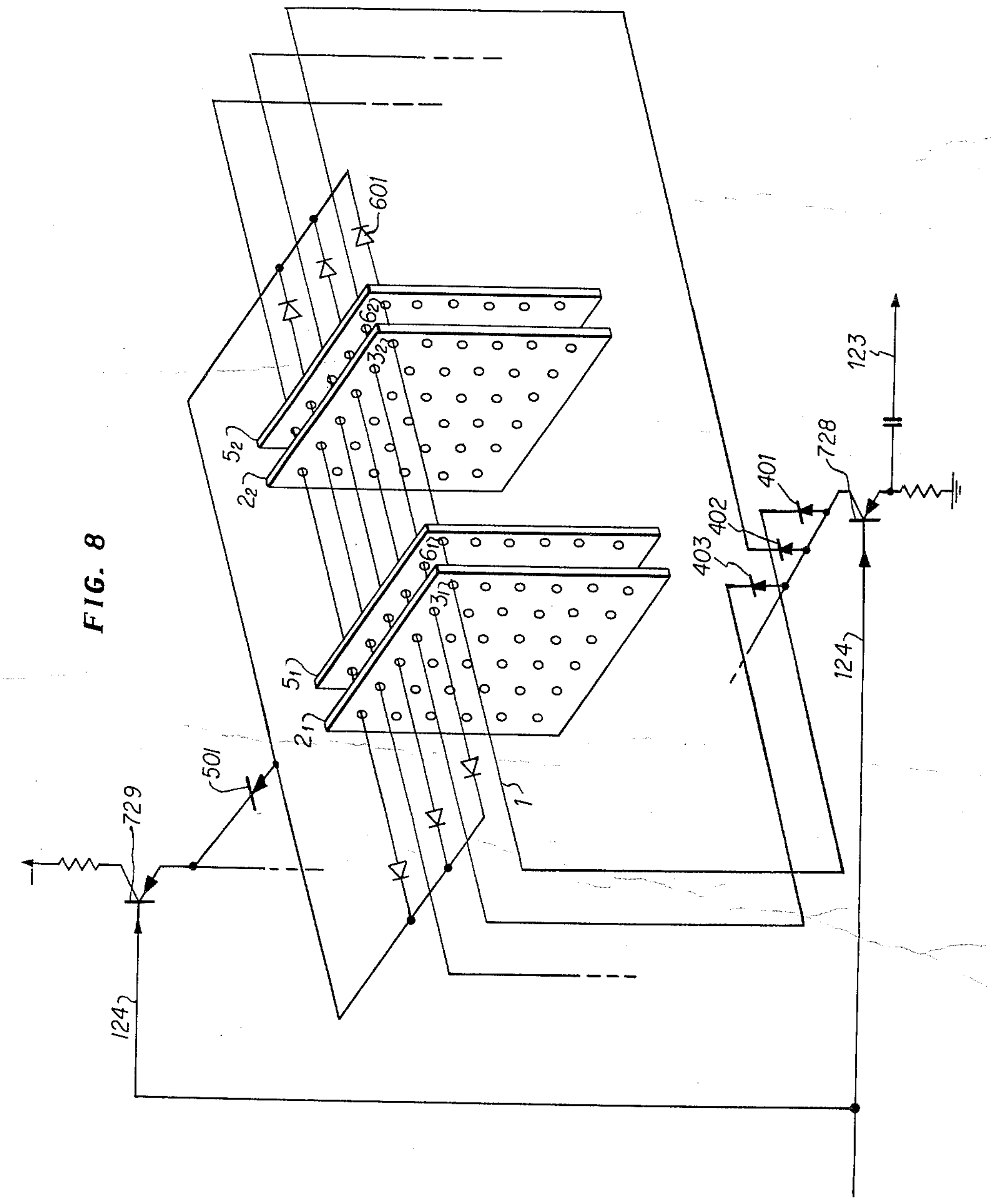
Figure 9:
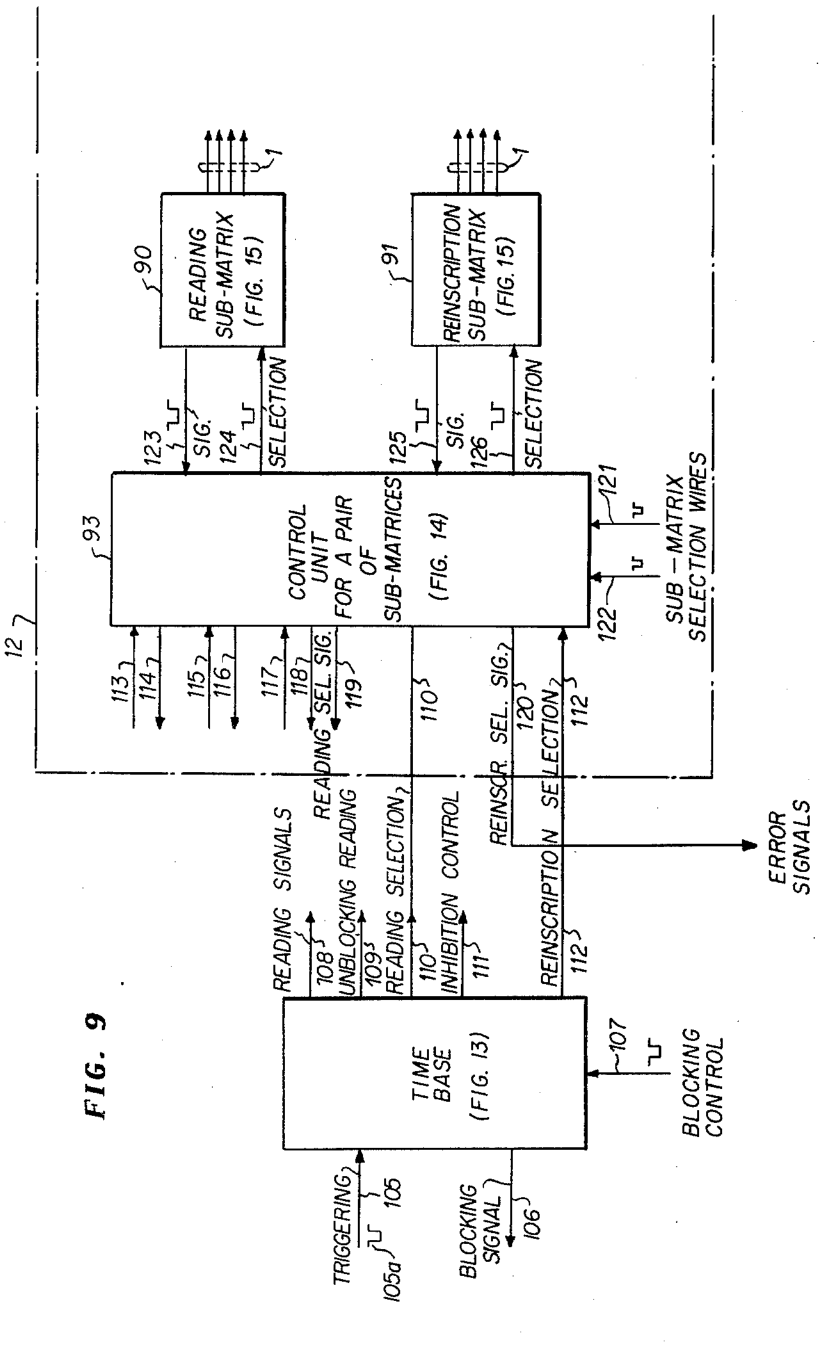
Figure 10:
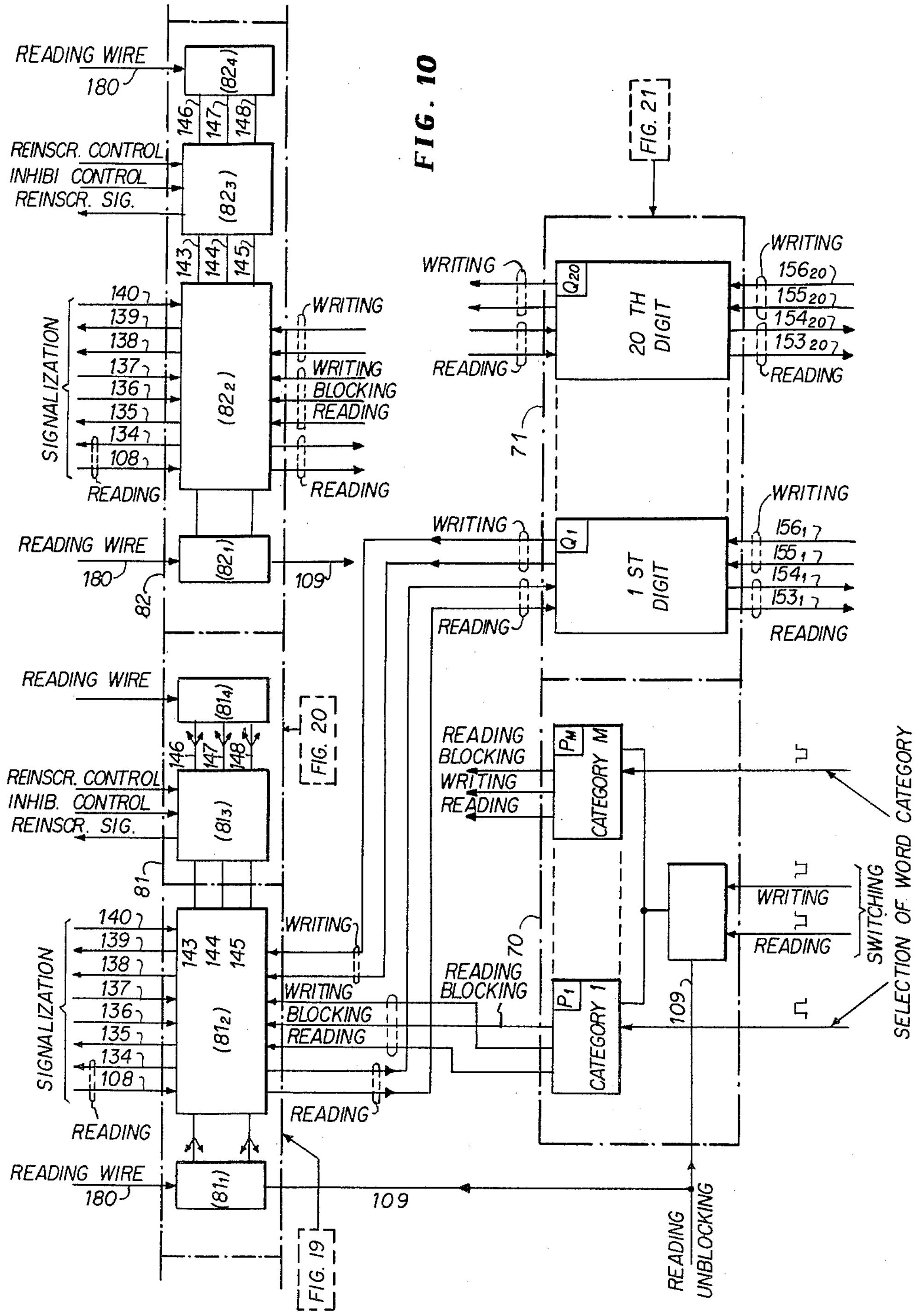
Figure 11:
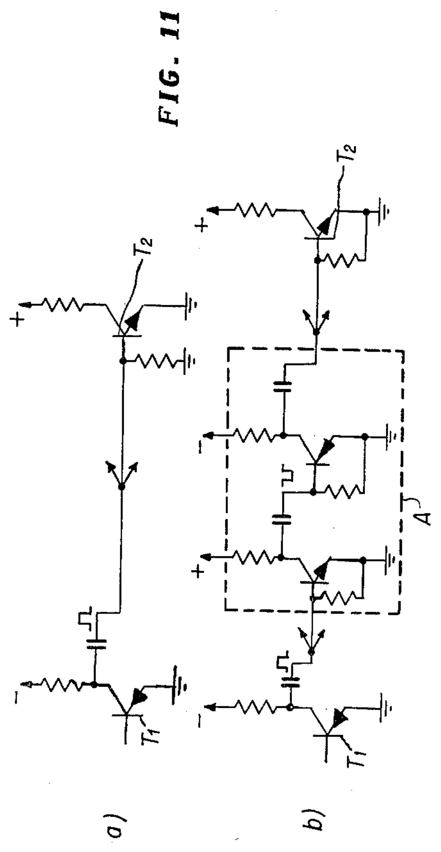
Figure 12:
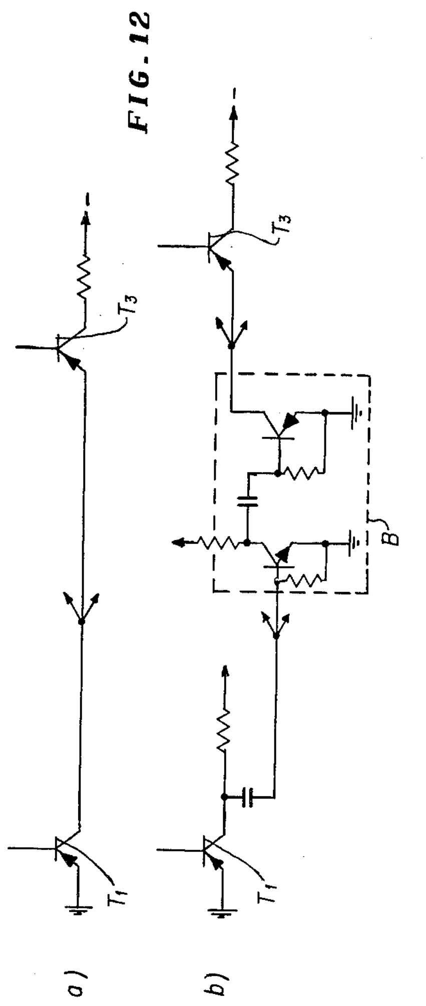
Figure 13:
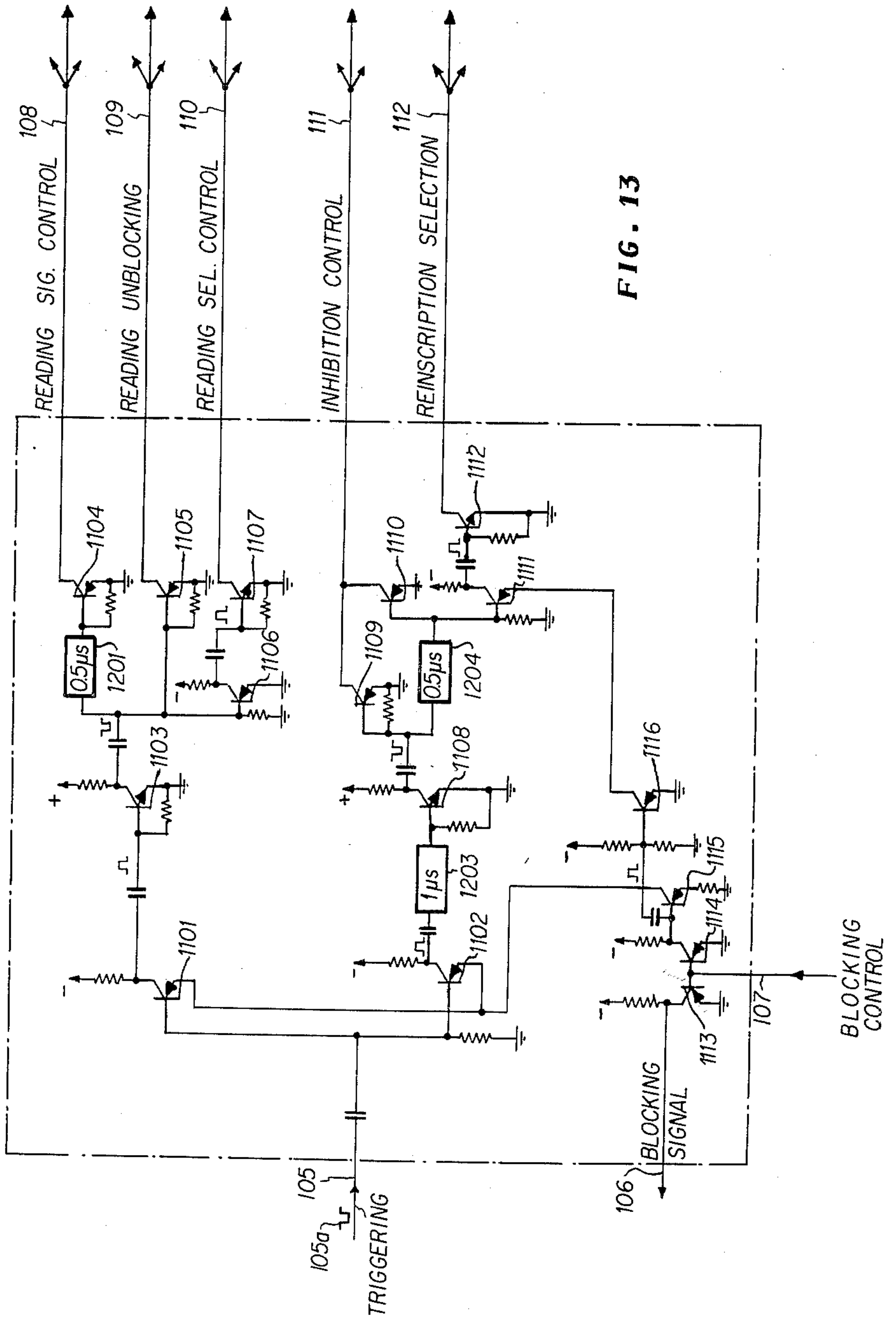
Figure 14:
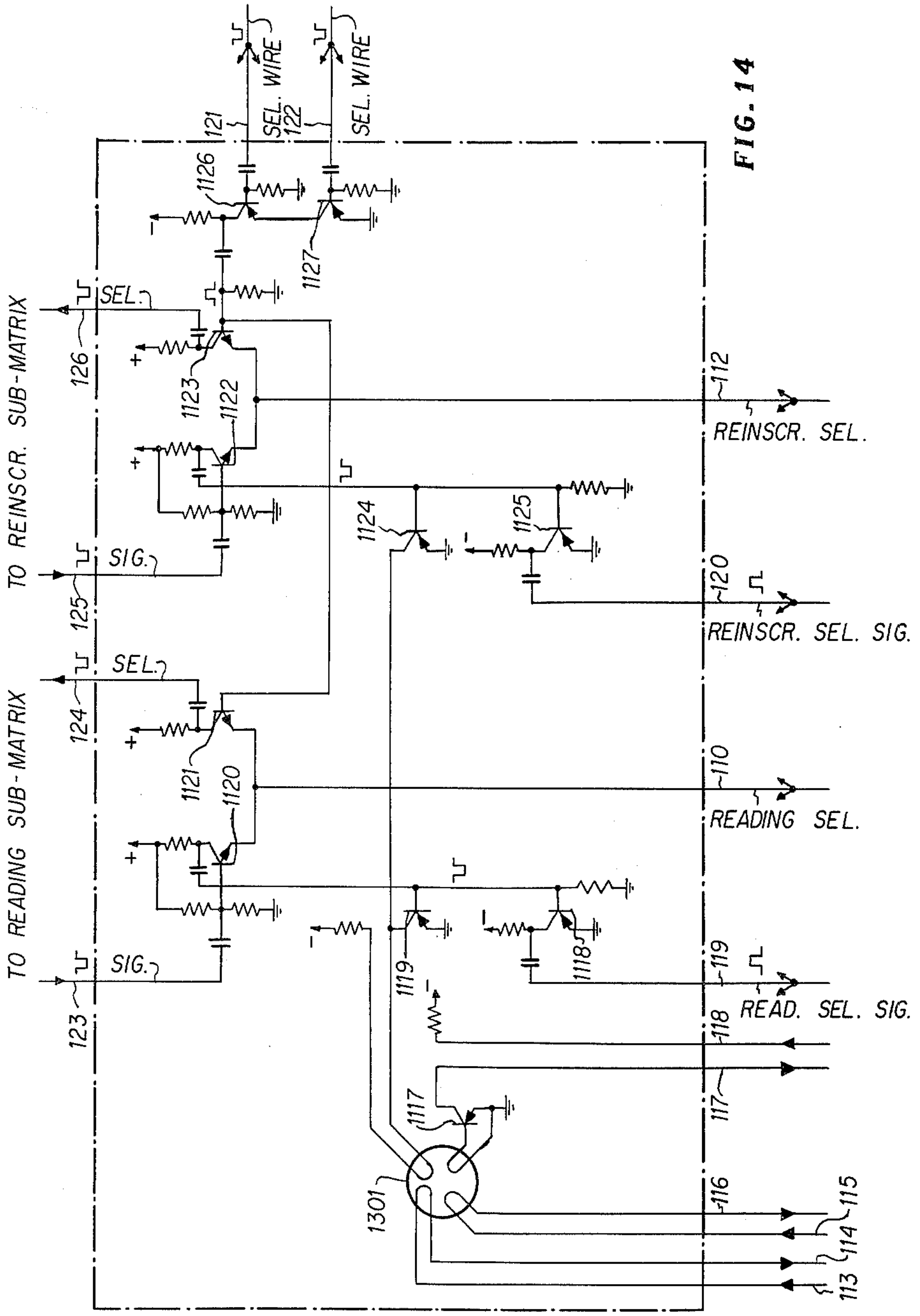
Figure 15:
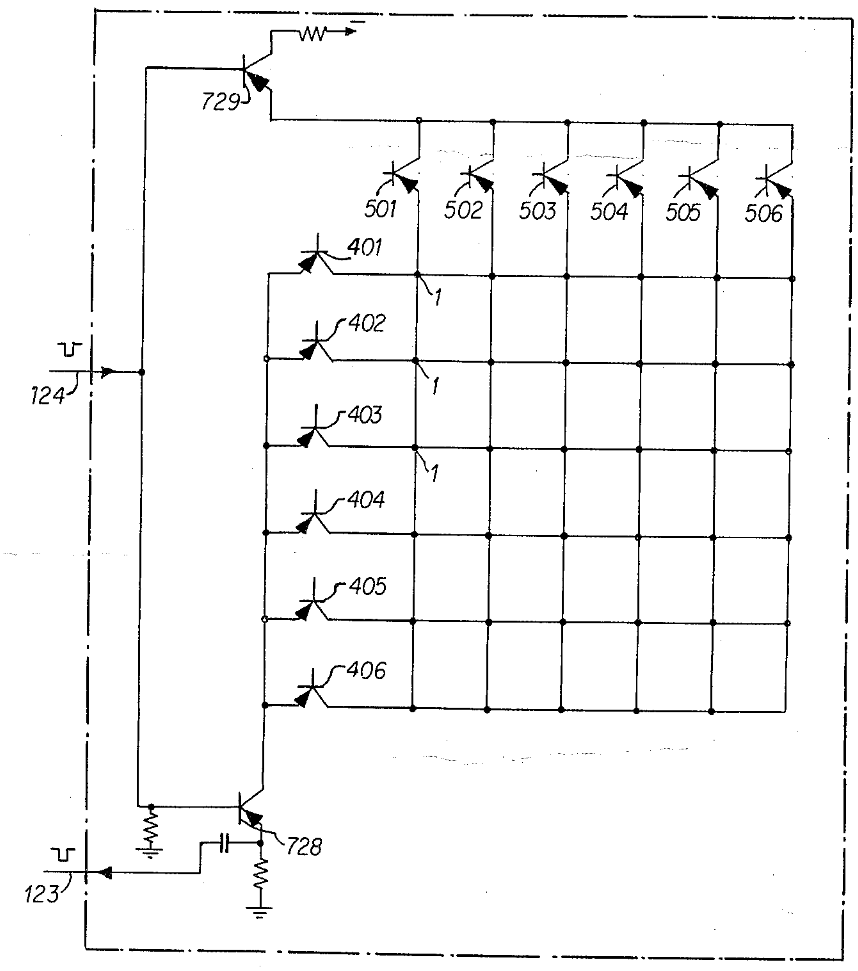
Figure 16:
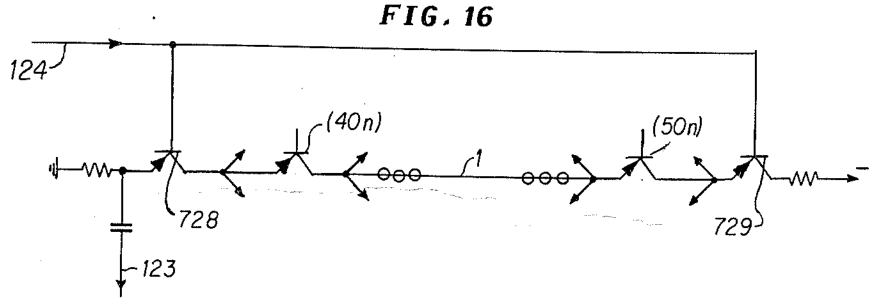
Figure 17:
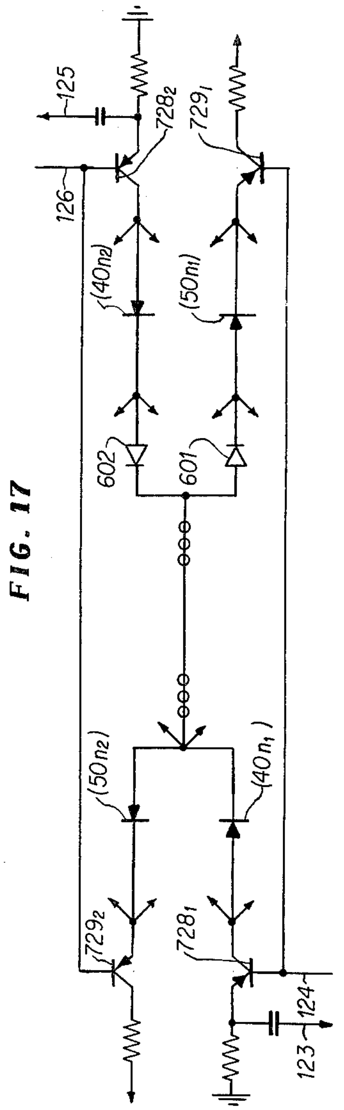
Figure 18:
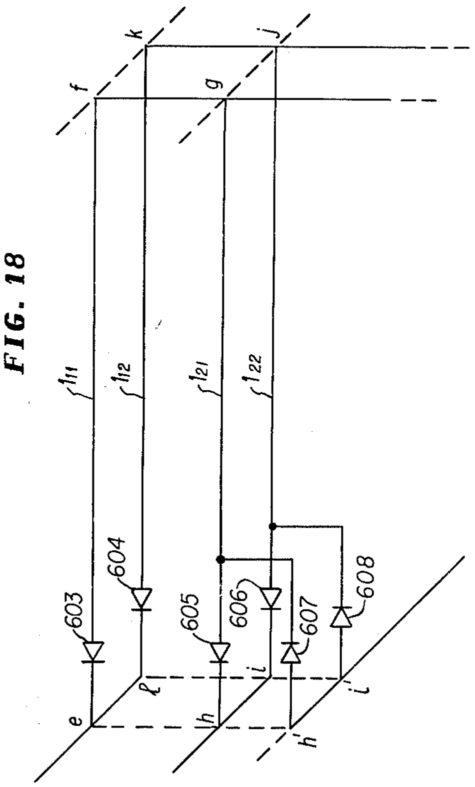
Figure 19:
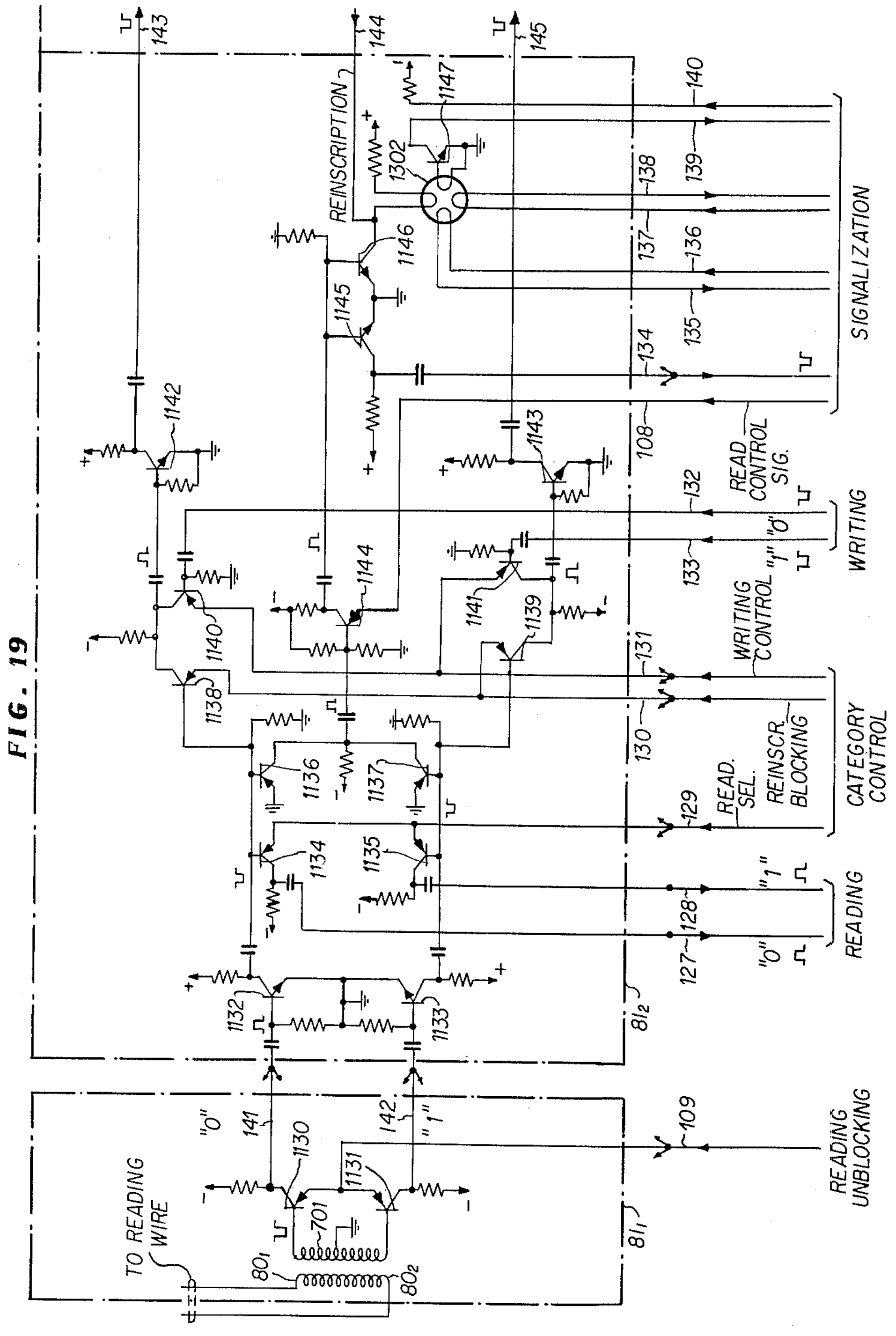
Figure 20:
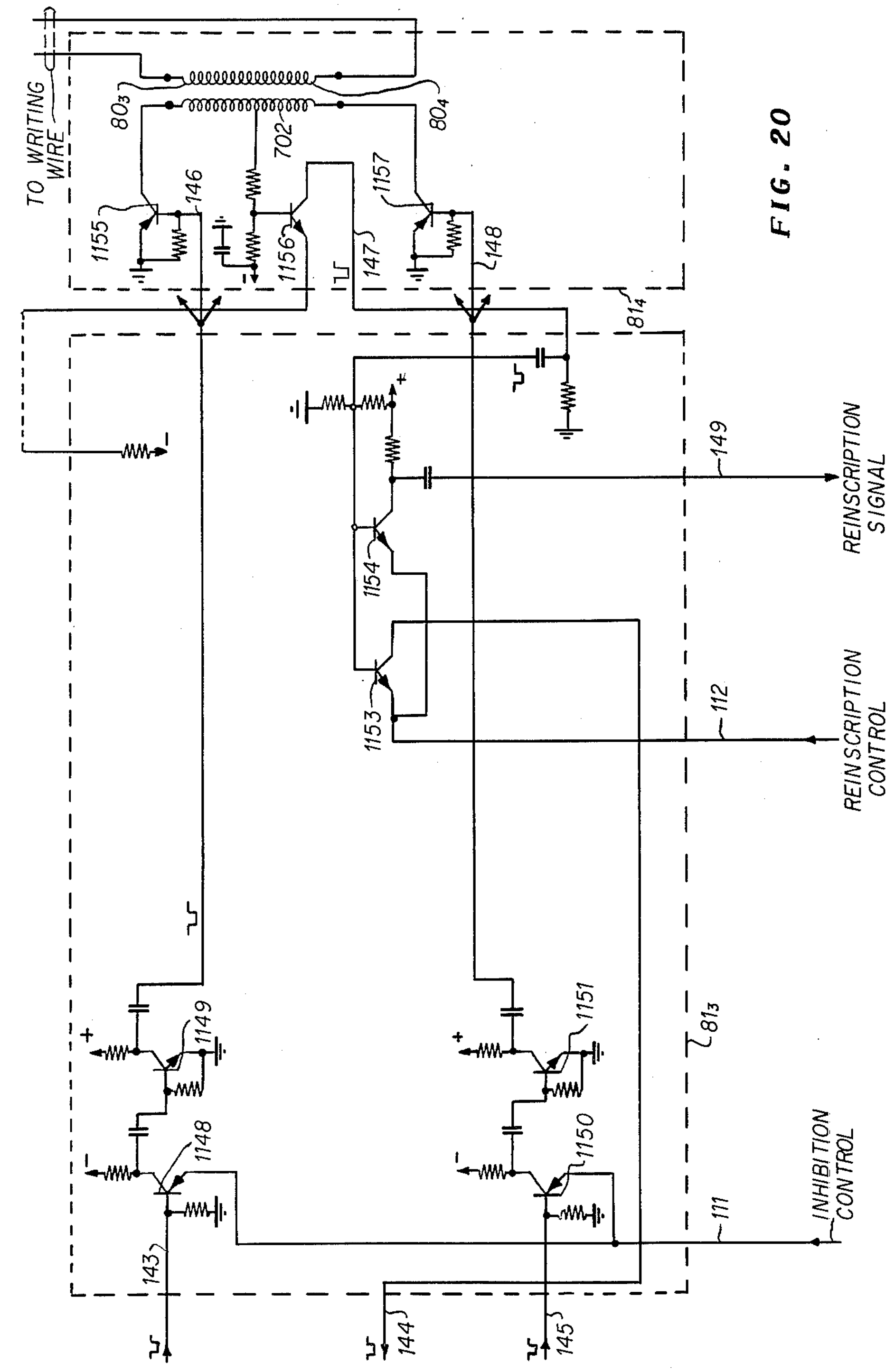
Figure 21:
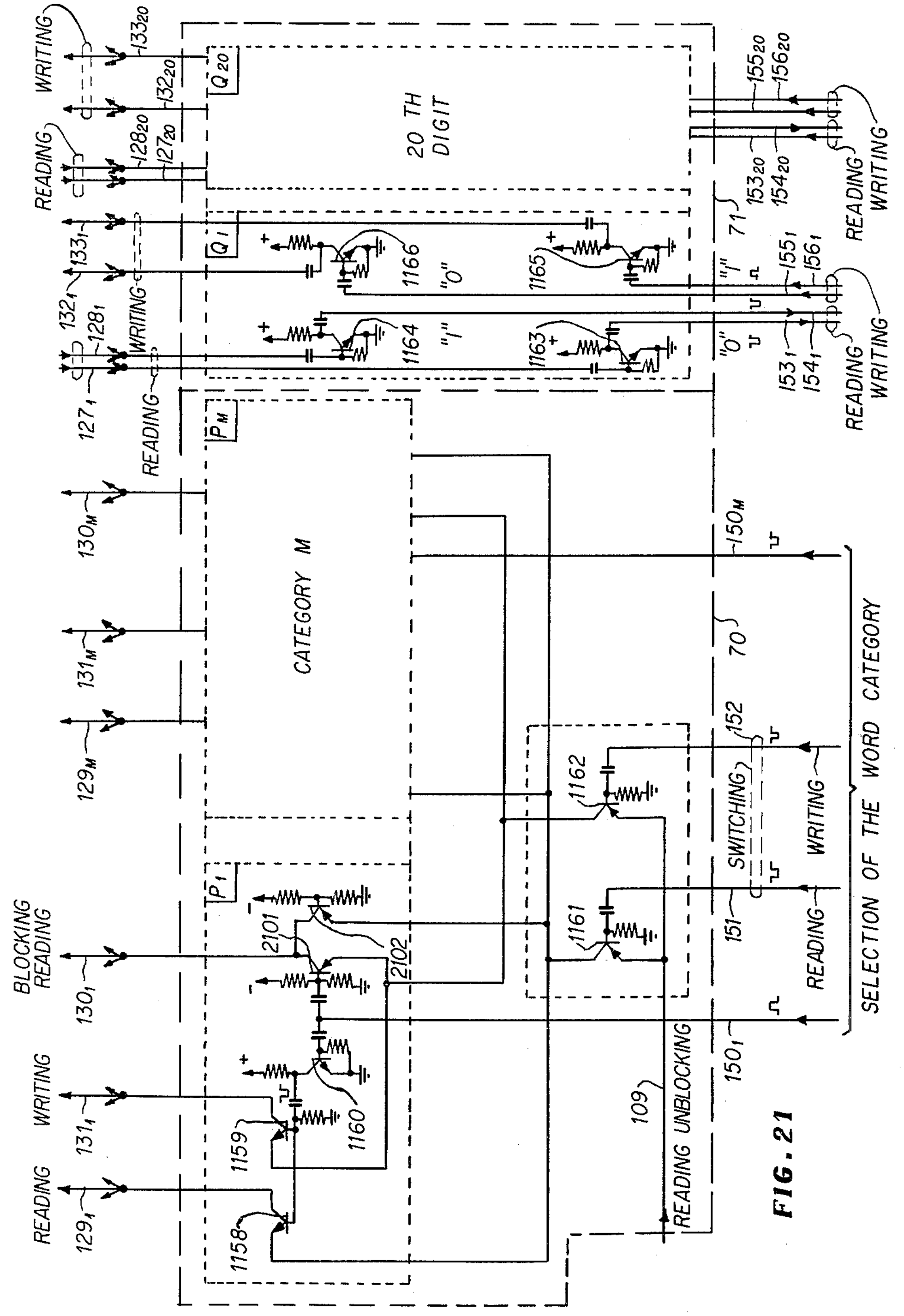
Figure 22:
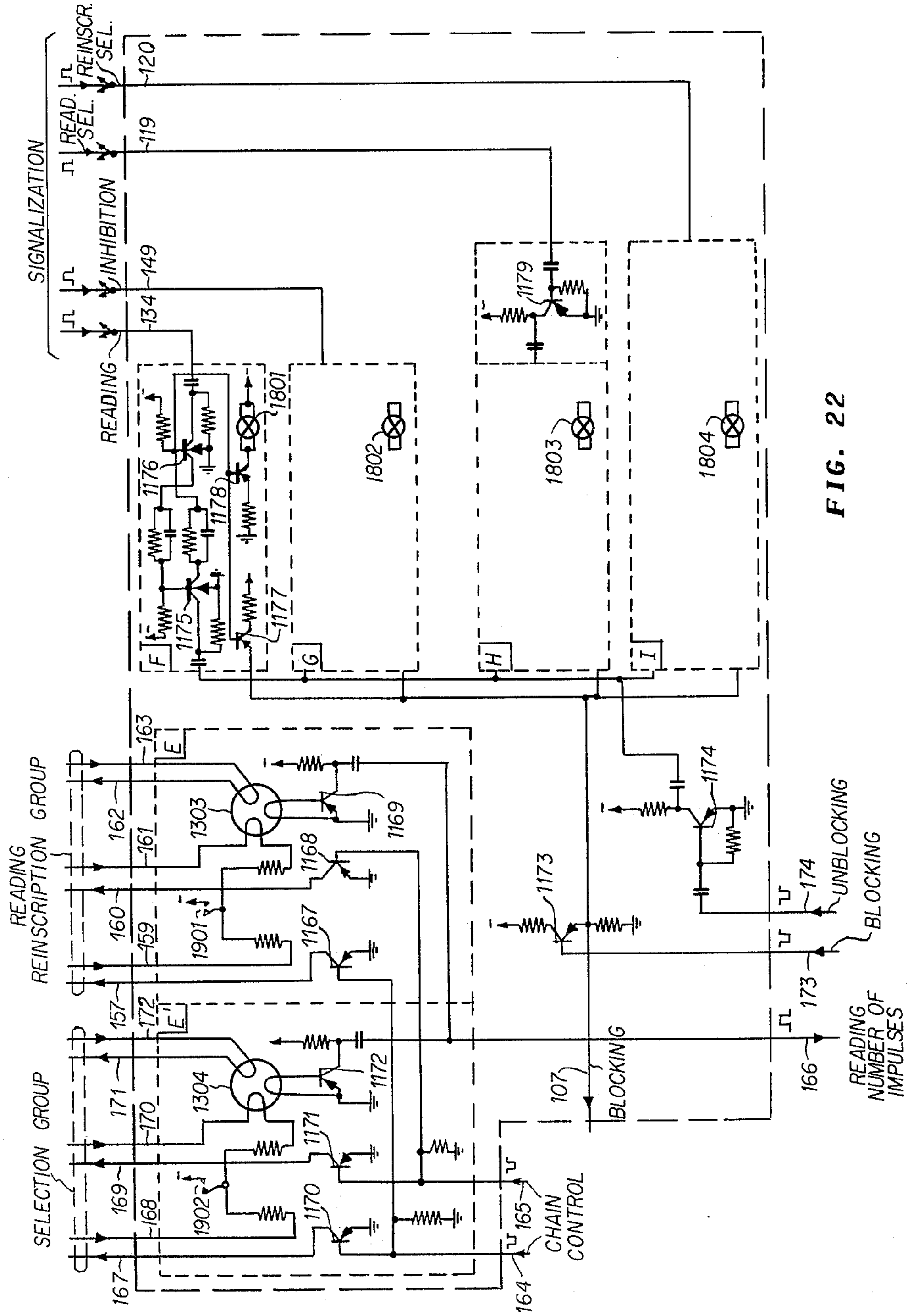
Figure 23:
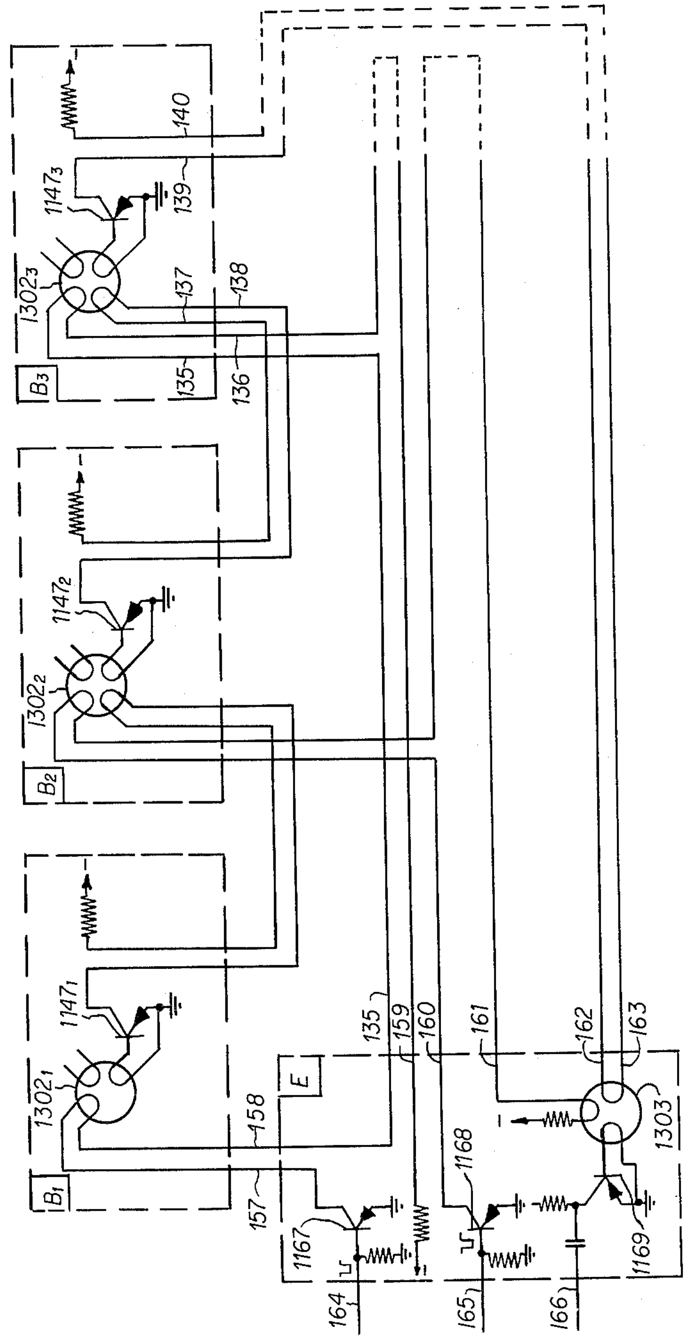
Figure 24:
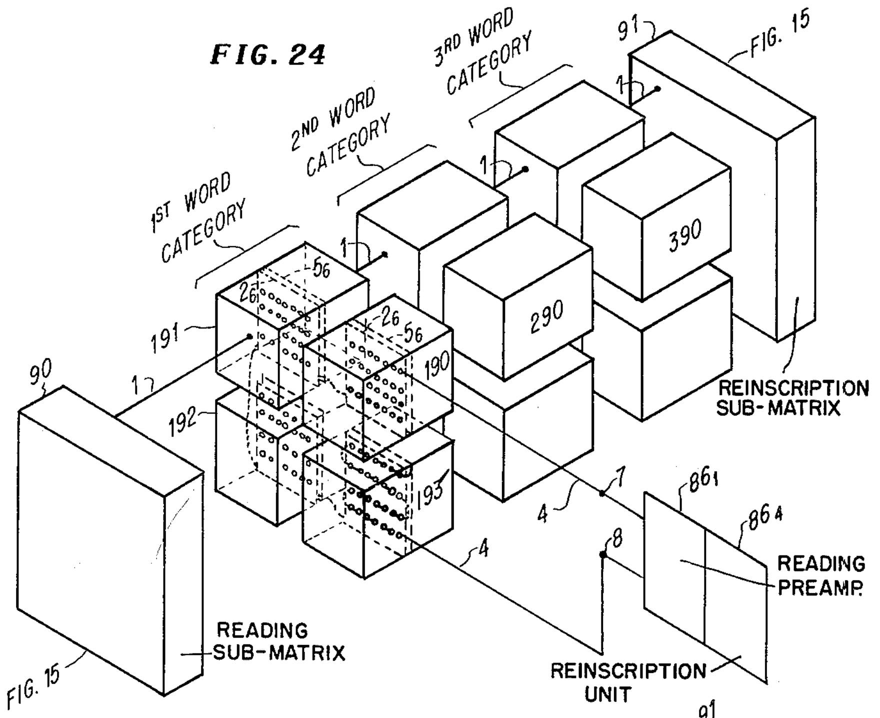
Figure 25:
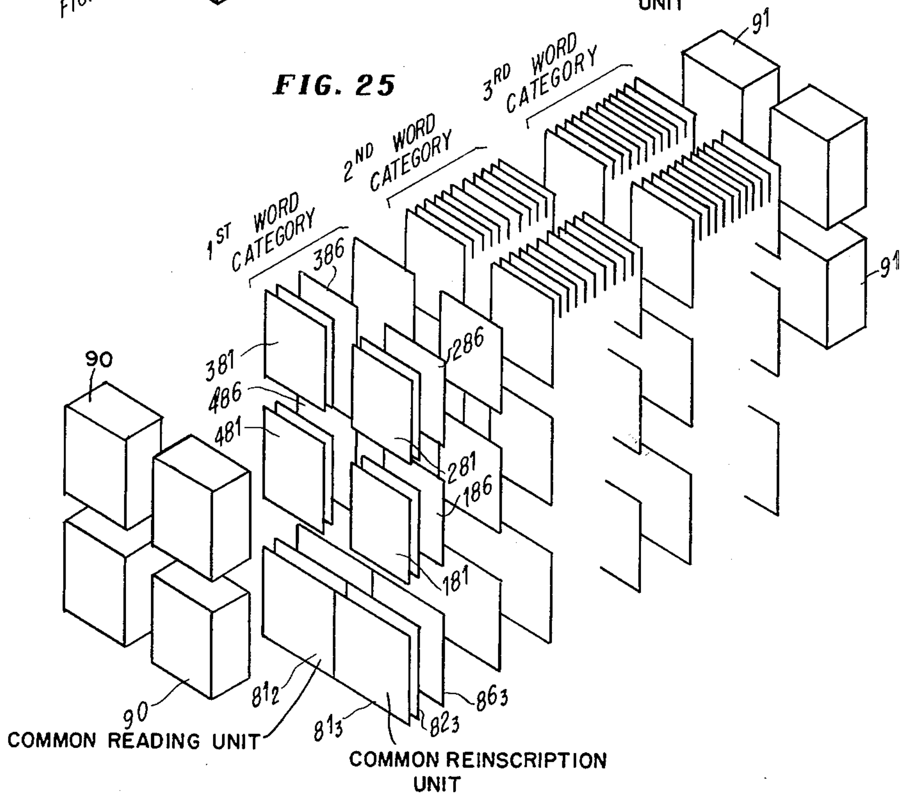

FIG. 3 permits the comparison of the reversing impulses appearing on the reading wire when the memory is composed of single plates or pairs of plates;

FIG. 4 represents an element of a memory using pairs of plates;

FIG. 5 relates to the reading and reinscription operations in memories utilizing pairs of plates;

FIG. 6 shows the general interconnections of a memory in which certain items have been perfected by the introduction of devices conforming to the invention;

FIG. 7 represents an element in a memory utilizing a pair of ferrite plates pierced with holes, and the cabling of a reading wire;

FIG. 8 represents the feeding arrangement of the exciting wires according to the invention;

FIG. 9 shows the manner of associating a reading sub-matrix and a reinscription sub-matrix with their group of control units which is in turn connected to the group of time bases;

FIG. 10 shows the general interconnections of the reading, writing and reinscription circuits;

FIGS. 11 and 12 show the schematic diagrams for the transistors employed in the different assemblies constituting the memory of the invention;

FIG. 13 is a schematic diagram of the time base circuits;

FIG. 14 is a schematic diagram of a control unit for a sub-matrix;

FIG. 15 is a schematic of a selection sub-matrix;

FIG. 16 is a simplified diagram of FIG. 15;

FIG. 17 is likewise a simplified diagram showing the connection arrangement for a single exciting wire in a reading sub-matrix and a reinscription sub-matrix;

FIG. 18 shows the arrangement of rectifier elements in a sub-matrix;

FIG. 19 is the schematic of a reading preamplifier and a group of common units for reading and writing;

FIG. 20 is a schematic of the inhibition sources of a group of common units for reinscription;

FIG. 21 is the schematic of the central unit for reading, writing and the selection of the word category;

FIGS. 22 and 23 relate to the unit for signalling errors and controlling the blocking;

FIGS. 24 and 25 are figures illustrating the general interconnections of the memory.

In order to facilitate the description of the invention, certain points in the technique of plate type memories will be reviewed. Concerning this technique, reference may also be made to the article by Rajchman, entitled "Ferrite Apertured Plate for Random Access Memory," which appeared in the "Proceeding of the I.R.E.," March 19, 1957, pages 325 to 334.

It is known that magnetic materials intended for binary memories have a magnetic hysteresis cycle which is substantially rectangular. The magnetic materials presently employed are the ferrites.

Figure 1:
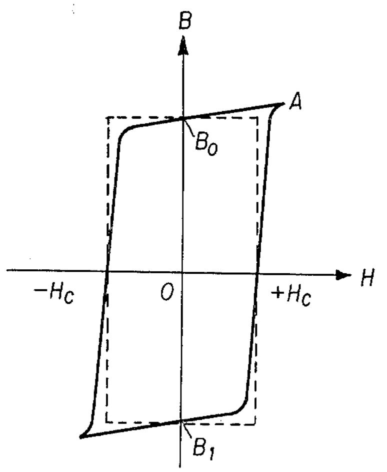
FIG. 1 represents the quasi-rectangular hysteresis cycle of a ferrite.

FIG. 1 represents the quasi-rectangular hysteresis cycle of a ferrite on the axis of abscissa where are shown the values H of an exterior magnetic field applied to the ferrite. The points marked $+H_c$ and $-H_c$ correspond to the coercive fields. On the axis of ordinates where is shown the inductance B in the ferrite, the points $B_0$ and $B_1$ characterize the remanent states of the said ferrite.

If an impulse of the magnetic field having a positive valve and superior to the coercive field $+H_c$ causes the ferrite to pass from the initial remanent state $B_1$ to the remanent state $B_0$ in describing the hysteresis cycle of the path $B_1$, $+H_c$, $B_0$, we say that the magnetization of the ferrite involved has changed direction or has reversed itself.

Figure 2:
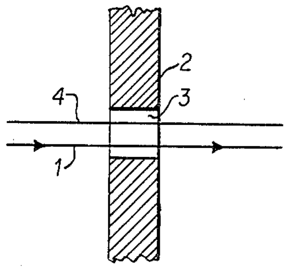
FIG. 2 shows a ferrite plate pierced with a hole for use in a memory.

FIG. 2 represents a ferrite plate 2 pierced with a hole 3. An exciting wire 1 traverses the hole 3. When an impulse of electric current is produced in the exciting wire 1, the ferrite is submitted to an impulse having a magnetic field. This has for effect to determine the magnetic state of the zone in the ferrite plate 2 located near the interior side of the hole 3.

If before the transmission of the impulse having the magnetic field, the remanent state of that portion of the ferrite surrounding the hole 3 was in the state $B_1$ shown in FIG. 1, the hole 3 reverses itself, since as previously stated, the said impulse with the magnetic field is positive and of a value superior to the coercive field $+H_c$.

The variation of the magnetic flux due to the reversal of the hole 3 causes an impulse of the electromotive force in the reading wire 4, FIG. 2, which also passes through the hole 3.

The hole 3 passing from the state 0 to the state 1, for example, a reversing impulse appears in the reading wire 4. It is shown at 101, FIG. 3, line *a*. Its amplitude is $V_1$ and its duration is T.

If on the other hand, before the transmission of the impulse of electric current, the remanent state of the portion of the ferrite plate surrounding the hole 3 was in the state $B_0$, this impulse does not cause any change in that state. The path described on the hysteresis cycle of FIG. 1 is $B_0$, A, $B_0$. On the reading wire 4 there appears an impulse 100 (FIG. 3, line *a*) having an amplitude $V_0$ much less than $V_1$.

If we produce an impulse with a magnetic field having an amplitude considerably inferior to the coercive field $H_c$, for example, of an amplitude $H_c/2$, the hole 3 will not reverse itself, regardless of its initial state.

To determine the state of a hole, it is therefore necessary to be able to distinguish between impulses such as 100 and 101 having the same polarity.

For the magnetic materials presently used for the perforated plates, the relationship of the amplitudes $V_1/V_0$ of the two types of impulses 101 and 100 is of the order of two or three. The distinction is therefore difficult to make and uncertain.

The relationship of the amplitudes $V_1/V_0$ is much higher when magnetic cores are used in place of ferrite plates. However, since the usage of plates is much more interesting from the economic point of view than the use of cores, methods of recording have been proposed compensating for the present imperfections in ferrite plates.

FIG. 4 gives a practical example of this. Two identical ferrite plates 2 and 5 are employed, pierced with holes and arranged parallel to one another in such manner that the axes of the respective holes such as 3 and 6 are aligned. The holes 3 and 6 are magnetized in opposite senses by a writing operation which will be described subsequently.

The exciting wire 1 traverses the hole 3 and then the hole 6. The writing wire 4 traverses the hole 3 in the same sense as the exciting wire 1; on the contrary it traverses the hole 6 in the opposite sense from the exciting wire 1.

An elementary memory therefore comprises two holes magnetized in opposite directions. An impulse of current of a certain polarity sent over the wire 1 always causes the reversal of one of these holes. At that moment there is received over the reading wire 4 an impulse the polarity of which depends on that of the holes which have been reversed, whereas its amplitude does not depend on it, if the selection matrix is arranged in such manner as to furnish exciting impulses with a steep front. In this case the impulse 201 (FIG. 3, line *b*) is produced. In the other case it is impulse 200 which appears.

There will now be given some details relating to the operations of reading, writing and reinscription in connection with the FIGURES 4 and 5.

On the writing wire 1 are sent in succession two impulses 3111 and 3112 of opposite polarity, of an amplitude $I_1$, the duration of which is at least equal to the reversing time T. As an example, this duration will be assumed to be equal to one microsecond, and the interval between the end of the first impulse and the beginning of the second will be assumed to be equal to a half microsecond.

During the first impulse a reading impulse appears on the reading wire 4. The holes 3 and 6 are then in the same state of magnetization and the information stored is destroyed.

To reinscribe this information the procedure is as follows:

Following the end of the first impulse 3111, these is sent over the reading wire 4 an impulse 3113 having an amplitude $I_{1/2}$, called an inhibition impulse.

One half microsecond after the transmission of the inhibition impulse in the reading wire 4, the exciting wire 1 is traversed by the impulse 3112 having an amplitude $I_1$. This tends to again reverse the two holes 3 and 6 simultaneously. However, the presence of the inhibition impulse 3113 in the reading wire 4 opposes the new reversal of one of the holes, which results in the reinscription of the information. The direction of passage of the inhibition impulse is determined by the hole which is to be reversed, which obviously depends upon the digit to be reinscribed.

The operation of writing is similar to that for reinscription, except that it is independent of the previous state of the holes and therefore of the previously described digit.

FIG. 6 shows the general interconnections for an improved memory conforming to the invention. In this figure the rectangle 11 represents the pile-up of ferrite plates, the rectangle 12 represents the assembly of selection matrices which permit the energization of the exciting wire corresponding to the desired word. This selection unit receives the selection signal from the apparatus, not shown in the figure, for the benefit of which it is desired to extract information from the memory, and which will be designated as a computer.

The group of selection matrices 12 is capable of giving the error signals and receiving the blocking signals.

The rectangle 13 represents the group of devices required for the reading, writing and reinscription operations.

These devices are particularly, the reading amplifiers and the sources of inhibition current associated with each pair of plates in the memory.

The rectangle 11 is connected symbolically to the rectangle 12 by an exciting wire 1, and to the rectangle 13 by a reading wire 4.

The units for signalling errors are likewise connected to these devices.

The reading signals are directed to the computer which sends the writing signals while acting at the same time on the selection matrices 12.

The rectangle 14 represents the group of devices necessary for the error signals and the blocking signals. The error signals coming from the selection matrix 12 and the reading, writing and reinscription devices 13, are centralized by the signalling devices 14, to be re-transmitted if necessary to a supervisory unit (not shown in FIG. 6), which is thus enabled to localize an error as soon as it appears. Furthermore, upon the appearance of an error, suitable devices in the group 14 immediately send a blocking signal to the selection matrix 12 and to the computer. This signal can also be transmitted if a blocking signal originates in the supervisory equipment.

With the four principal groups of apparatus the functions of which have just been specified, there should be associated the group of time bases (not shown in FIG. 6), the description of which will be given later. This group of time bases includes the different sources of impulse current required in the operation of the memory 11 for reading, reinscription and the signalization of errors. This group receives, on the one hand, the triggering impulses, and on the other hand, the blocking signals, which it re-transmits to the computer while blocking the memory by stopping the transmissions from the time base units.

There will now be given a description of the group of memories represented by the rectangle 11 in the FIG. 6.

FIG. 7 represents a pair of ferrite plates 2 and 5 having holes such as 3 and 6 and shows the cabling of the reading wire 4. Two adjoining holes on the same plate are traversed in opposite directions. It is, of course, necessary that there be a corresponding inversion of polarity in the corresponding exciting wires.

The two extremities 7 and 8 of the reading wire 4 are connected to the terminals of two transformers in parallel. One of these transformers is for reading, while the other is utilized for the inhibition current.

Each pair of holes such as 3 and 6 are traversed by the same exciting wire 1 which represents a word comprising a single binary digit. There are as many words as there are exciting wires. In other words, there are as many words as there are holes in the ferrite plates.

FIG. 8 represents a pile-up of pairs of ferrite plates $2_1$ and $5_1$ and $2_2$, $5_2$, . . . of the type described in connection with FIG. 7. All of these pairs of plates are traversed by the same exciting wires 1.

When $n$ pairs of ferrite plates are thus associated together, each exciting wire represents a word having $n$ binary digits capable of being read simultaneously, each pair of plates having its own reading devices (transformer and amplifier), and its own source of inhibition current each preceded by a transformer.

The device for feeding the reading wires will not be described for the moment.

The selection matrix shown in FIG. 6 at 12 contains the sources of exciting current for the exciting wires. It is divided, for a memory of large capacity, into submatrices of two categories: the sub-matrix for reading and the sub-matrix for reinscription.

In FIG. 9 the rectangle 12 of FIG. 6 is partially shown within the broken lines. It has been stated that this rectangle represented all of the selection matrices. A reading sub-matrix is represented at 90; a reinscription submatrix is shown at 91. These sub-matrices are connected to the time base unit 92 by way of a group of control units represented by the rectangle 93. This control group retransmits the signals on the time bases 92 to the associated sub-matrices 90 and 91 when the group 93 has been designated by the computer.

The group 93 can also transmit the fault signals of the sub-matrices.

The reference numbers of the connection wires in FIG. 9 are found again in FIGS. 13 to 15 referred to in the rectangles 90 to 93.

FIG. 10 shows the general interconnections of the devices contained in the rectangle 13 of FIG. 6, that is to say, the devices necessary for the operations of reading, writing and reinscription. The reference numbers of the connection wires are again found in FIGS. 19 to 21.

The rectangles in dotted lines such as 81, 82, represent groups of identical construction.

Rectangle 81 for example, represents the reading, writing and reinscription devices such as read-out amplifiers and sources of inhibition current associated to a pair (or a group of pairs) of ferrite plates in the memory containing the digits of a given rank for all of the words of the same category.

It is possible to place in series, on a single exciting wire traversing the holes of the same coordinates of each plate, a succession of words of different categories, with the words of different categories having different numbers of digits. This is made possible by the presence of central devices for reading, writing, and word category selection, which centralize the relationships of the memory system with the computer, and are represented in FIG. 10 by the dotted-line rectangles 70 and 71. By virtue of these central devices, the computer can select the words of category $n$ for example, and be connected to the devices of the corresponding rectangles 81, 82, etc., for the operations of writing and reading.

The groups 81, 82, . . . are provided with the devices required to enable them to be associated with the central devices 70 and 71, and assuring the automatic reinscription of the categories which are not involved at the moment of reading in a patricular category.

The arrangement described permits, on the one hand, the placing of several words in series on an exciting wire, and on the other hand, to reduce the cost of the selection matrices correspondingly. The general interconnections of a memory so arranged will be better understood upon reading the explanations which will be given subsequently in connection with FIGS. 24 and 25. This arrangement requires a suitable feeding means for all of the holes traversed by the exciting wire.

The selection sub-matrices provided should be able to provide strong impulses of current with a short front (400 milliamperes and .3 microsecond, for example), in order to profit from the speed of the reversals (.8 to 1 microsecond, for example). Since the ascent time increases with the number of holes to be excited, it follows that if it is desired to excite a large number of pairs of ferrite plates in series with the desired speed, it is necessary to provide powerful selection sub-matrices, capable of furnishing a current of high value from a current of low value.

In the techniques of the prior art, cores of magnetic material having a rectangular cycle of hysteresis, and of dimensions sufficient for accommodating a large number of turns have been used in such sub-matrices. These cores, arranged in matrices, are each provided with two primary windings which permit reversing the desired core and that core only, by the conjunction of two sources of current of low potential. One of these sources is associated with a line of the matrix of which the core forms a part, while the other source is associated with a column of the same matrix. The current required for the exciting wire is received by means of the secondary winding which is provided on each core.

This method of arranging the sub-matrices is not suitable when it is desired to obtain short impulses with a steep front. It presents in addition, other inconveniences: there is a core for each exciting wire, and the cores of the same line and the same column of the matrix being half excited, are not reversed, but given nevertheless a weak electric current which appears in the form of parasitic signals on the reading wire.

In connection with core matrices of this type, reference may be had to the article by D. S. Ridler and R. Grimmond, entitled "The Magnetic Cell: A New Circuit Element," published in the "Proceedings of the Institution of Electrical Engineers," volume 104, 1957, part B, supplement No. 7, at the Convention on Ferrites in November and October 1956, pages 445 to 456.

In this same article there is described another method of matrix construction which does not have the inconveniences mentioned above with reference to the speed and the parasitic signals. In this new construction, the cores are replaced by symmetrical transistors excited similarly by a coincidence circuit. The transistors are capable of furnishing a high output current from a current of low potential.

In this last arrangement, however, there is still a transistor for each exciting wire.

In the transistor type selection matrix of the invention, on the other hand, a line transistor is connected to all of the exciting wires of the same line of the matrix, and a column transistor is connected to all of the exciting wires of the same column.

The exciting current passes over a particular exciting wire only if the corresponding line and column transistors are simultaneously unblocked.

Referring again to FIG. 8, it is seen that the exciting wire 1 connecting the emitter of the column transistor 501 to the collector of the line transistor 401 is excited only if the two transistors in series are unblocked simultaneously. It is assumed that the control transistors 728 and 729 of the sub-matrix are also unblocked.

This arrangement, in accordance with the invention, permits a saving in transistors, and the feeding of a pile-up of a large number of ferrite plates. It is accordingly thus possible, either to read simultaneously a large number of digits corresponding to the number of pairs of ferrite plates in the pile-up, or to place several words in series on the same exciting wire.

It should be noted that two adjacent exciting wires in the same line are fed in opposite senses. It was already stated, in the explanation given in connection with FIG. 7, that this arrangement simplifies the cabling of the reading wire.

In the article by Rajchman, previously cited, (pages 331–332), mention is made of a selection matrix with a pile-up of control plates in which the line and column sources are utilized for reversing all the holes of the same line, except the holes traversed by the wire to be excited. The reversing energy of the holes which have been reversed by the line and column sources serve to activate the exciting wire by virtue of suitable cabling.

Such an arrangement is economical in current sources, but necessitates that the thickness of the magnetic materials used in the controlling pile-up be greatly superior to the thickness of the magnetic materials comprising the controlled pile-up, particularly when we consider the considerable energy losses in the cabling, when it is desired to obtain gradient times of short duration (.3 microsecond, for example).

From the preceding considerations it follows, that in the case of a large pile-up, we are confronted with an even greater number of holes to be excited in the controlling plates, which makes it impossible to obtain gradient times of short duration.

The transistor matrix of the invention is superior to the matrices of the prior art with respect to the following points: (*a*) total reading time; (*b*) total reinscription time; (*c*) necessary safety margin time.

Before passing to the detailed description of the different parts of the memory system of the invention, a few preliminary remarks will be made.

In the schematic diagrams hereinafter described will be found transistor circuits such as those shown in the FIGS. 11 and 12.

In FIG. 11, line *a*, is shown a transistor $T_1$ of the type p-n-p exciting a certain number of transistors such as $T_2$ of the opposite type n-p-n connected in parallel through their bases. It is quite evident that a single transistor p-n-p can excite only a limited number of transistors n-p-n in parallel. To excite a larger number, the schematic of FIG. 11, line *a*, should be replaced by the schematic of FIG. 11, line *b*. The p-n-p transistor $T_1$ excites several amplifiers in parallel, each comprising for example, two transistors. To each amplifier, a number of transistors n-p-n to be excited, such as $T_2$, are connected in parallel.

It will be obvious that we can excite a number of transistors p-n-p by means of a transistor n-p-n, in the same manner.

In FIG. 12, line *a*, there is shown a transistor $T_1$ of the type p-n-p, connected in series with a number of transistors of the same type, such as $T_3$, in parallel. When the transistors $T_3$ to be excited in this manner are too numerous, the schematic of FIG. 12, line *a*, should be replaced by the schematic of FIG. 12, line *b*, which includes several intermediate amplifiers B connected in parallel and placed between the exciting transistor and the transistors to be excited. It is quite evident that we may, in the same manner, by using a transistor of the type n-p-n excite a number of transistors of the same type.

FIG. 13 shows the circuit of the time bases represented in FIG. 9 by the rectangle 92. As previously mentioned, the reference numbers of the connecting wires are the same as in FIGS. 9 and 13.

The triggering impulses reach the time base circuit over the wire 105. They have a duration of approximately 1 microsecond each, and are separated by a time interval corresponding to the access time of the memory system, such as three microseconds, for example. One of these is shown at $105_a$.

For reading, three time bases are employed:

(1) The triggering impulses such as $105_a$ are amplified by the transistor 1101, 1103, 1106 and 1107. They are directed by the connecting wire 110 (reading selection control, FIG. 9) to the selection sub-matrix, and serve to define the duration of the exciting impulse during the reading.

(2) By the intermediary of the transistors 1101, 1103, 1105 and the connecting wire 109 (read-out unblocking, FIG. 9) there are transmitted at the same time, the impulses for unblocking the reading amplifiers.

(3) By the intermediary of the transistors 1101, 1103 the delay line 1201 (.3 microsecond, for example) the transistor 1104, and the connecting wire 108 (reading signal control) there are transmitted impulses identical with the preceding, with a delay of .3 microsecond, and serving to unblock certain devices for signalling errors during the reading.

For reinscription, two time bases are employed:

(1) The time base assigned to the exciting wires includes the transistor 1102, the delay line 1203 (one microsecond, for example), the transistor 1108, the delay line 1204 (.5 microsecond, for example) the transistors 1111, 1112 and the connecting wire 112 (reinscription selection) which leads to the selection sub-matrices.

(2) The time base controlling the transmission of the inhibition current in the reading wire of each group of pairs of ferrite plates (impulses shown in dotted lines in FIG. 5, line *b*) includes the transistor 1102, delay line 1203 (one microsecond, for example), transistor 1108 and, on one side the transistor 1109, and on the other side delay line 1204 (.5 microsecond, for example), transistor 1110 and finally the connecting wire 111 (inhibition control, FIG. 9), which directs the impulses to the inhibition current sources.

The time base for the inhibition current acts .5 microsecond before the time base for the exciting wires, and continues to act during the entire operating time of the time base for the exciting wires. It will be seen that this condition is necessary so that the same inhibition source can feed efficaciously a very large number of holes.

The group of time bases shown in FIG. 13 may be blocked by a negative potential in the wire 107 (blocking control) from the group of devices for signalling errors and controlling the blocking as represented by the rectangle 14 in FIG. 6. This potential unblocks the transistors 1113 and 1114. By means of the transistor 1113 and the connecting wire 106, the blocking signal is retransmitted to the computer. On the other hand, transistor 1114 in the unblocked condition, blocks the transistor 1115, which cuts off the feed to transistors 1101 and 1102. The time bases for reading, and the time bases for reinscription, are thus blocked. In order to prevent the arrival of a blocking signal at the end of the reading time from stopping the signal from the time base for reinscription, because of the delay caused by the delay lines 1203 and 1204, a supplementary blocking is inserted by means of the transistor 1111, under control of the transistor 1116, which is normally unblocked except momentarily when the transistor 1114 has just been unblocked.

On the other hand, there is no difficulty when the inhibition time base acts over the wire 111, since there is no danger of any information being destroyed by the inhibition current.

The blocking signal thus stops the memory system immediately, preventing any supplementary risk of destruction of information.

FIG. 14 shows the circuit of the control group for a pair of sub-matrices, represented in FIG. 9 by the rectangle 13.

As previously stated, the control unit for a sub-matrix serves to retransmit the signals from the time bases to the pair of sub-matrices associated therewith when the said control unit has itself been selected by the computer. This same control unit transmits, in addition, the error signals from the pair of sub-matrices.

It will be recalled that the group of sub-matrices forms the selection matrix represented in FIG. 6 by the rectangle 12.

The identity of a sub-matrix is characterized by two coordinates corresponding to the selection wires 121 and 122. The selection signals arriving over these wires unblock respectively the transistors 1126 and 1127.

When these transistors are unblocked simultaneously, a positive potential appears on the collector of transistor 1126, of a value sufficient to unblock transistors 1121 and 1123.

However, a variation of potential on the collector of transistor 1121 appears only if transistor 1107 of the time base (FIG. 13), connected to the control unit involved (FIG. 14) by the wire 110, is likewise unblocked. The wire 110 thus serves to retransmit the signal from the reading time base, for controlling the excitation of the exciting wires. This signal is therefore finally retransmitted by the intermediary of transistor 1121 and wire 124, to the corresponding sub-matrix for its operation.

The wire 112, coming also from the reinscription time base (FIG. 13), retransmits in the same manner the signals from the said reinscription time base, by the intermediary of transistor 1123 and wire 126, to the corresponding reinscription sub-matrix for its operation.

The procedure for the selection of the sub-matrices having been described in the foregoing, we will now explain how an error in a sub-matrix is indicated. We will consider the case of a failure in a reading sub-matrix.

The transistor 1120 is normally unblocked by virtue of an appropriate potential applied to its base by the intermediary of a potentiometer. A variation of potential can appear on its collector only during the arrival over the wire 110, of signals from the reading time base. At the same time, the blocking impulse coming from the reading sub-matrix arrives on its collector over the wire 123. This impulse indicates that the said reading sub-matrix has operated properly. This same impulse blocks transistor 1120. A potential appears therefor on the collector of this transistor only if the reading sub-matrix has not operated.

The error signal is retransmitted by the transistor 1118 and the wire 119 to the error signalling unit (rectangle 14, FIG. 6). The identity of the defective sub-matrix is registered at the same time in the following manner.

By the intermediary of the transistor 1119 the error signal flows in the winding of a ferrite core 1301 having a rectangular hysteresis cycle. The core 1301 is magnetized in a particular direction which permits finding the defective sub-matrix again, subsequently, as will be explained hereinafter in connection with the description of the error signalling unit.

The failure of a reinscription sub-matrix is signalled over the wire 125. This signal is retransmitted to the error signalling unit by the transistors 1122 and 1125 and the wire 120. The signal is recorded in the ferrite core 1301 already mentioned by the intermediary of transistor 1124.

FIG. 15, completed by FIG. 8, shows a selection sub-matrix having six lines and six columns. The reading and reinscription sub-matrices are similarly arranged.

Let us first reconsider the principle of operation of a selection sub-matrix.

The exciting wires 1 of a same line of the sub-matrix, seen from the end in FIG. 15, are all connected to the collector of a transistor. For example, the exciting wires of the first line are connected to the connector of transistor 401.

The exciting wires of a same column of the sub-matrix are connected to the emitter of a transistor. For example, the exciting wires of the first column are connected to the emitter of transistor 501.

When the time base signal arrives at the unit 93 (FIG. 9) over the wire 124, it unblocks the feed transistors 728 and 729.

On the other hand, if for example, the transistors 401 and 501 are unblocked by the computer, the exciting wire placed at the intersection of the first line and the first column of the matrix is excited.

It is necessary that the selection signals coming from the computer persist during the access time of the memory, that is, three microseconds, in the present case, whether it is for the selection of the sub-matrix, or for the selection of the exciting wire, or for the selection of the word category as will be described hereinafter.

If the sub-matrix involved does not operate properly, because of a failure of one of the selected transistors 401, 501, for example, or of one of the transistors 728, 729, there is no change of polarity on the emitter of transistor 728. However, if the same sub-matrix operates normally, there is a change of polarity on the emitter of transistor 728, and therefore during the reading time, a negative impulse is transmitted by the wire 123 to the unit 13 (FIG. 9).

FIG. 16 is nothing more than FIG. 15 simplified, in which are shown only the elements concerning the line $n$ and the column $n$ of the sub-matrix described above.

The said FIG. 16 permits a better understanding of FIG. 17, which represents in simplified form a reading sub-matrix and a reinscription sub-matrix connected to the same exciting wires 1.

The transistors $40n_1$ and $50n_1$ of the reading sub-matrix, and the transistors $40n_2$ and $50n_2$ of the reinscription sub-matrix, selected by the computer, are unblocked simultaneously during the three microseconds of the access time. The reading sub-matrix excites the selected exciting wire only during the reading time, since the feed transistors $723_1$ and $729_1$, controlled over the wire 124, are unblocked only during the reading time. The reinscription sub-matrix is unblocked during the reinscription time by virtue of its feed transistors $728_2$ and $729_2$ controlled by the wire 126.

With reference to the connections indicated in FIG. 17, it is seen that there will pass successively, in the selected exciting wire, two impulses of exciting current in opposite senses, as was explained in connection with FIG. 5. The first impulse passes during the reading time, and the second impulse then follows, during the reinscription time.

In order that the selected exciting wire be the only one excited, it is necessary to add two rectifier elements for each exciting wire.

The rectifier element 601 is associated with the reading matrix (FIGS. 8 and 17). The rectifier element 602 is associated with the reinscription matrix (FIG. 17).

To explain the rule of these rectifier elements, reference should be made to FIG. 18 which relates to the reading sub-matrix.

In this figure are shown four exciting wires chosen by way of example from the lines 1 and 2, and the columns 1 and 2 of the reading sub-matrix. The wire $1_{11}$ belongs to the line 1 and to the column 1 of the sub-matrix; the wire $1_{12}$ belongs to the line 1 and the column 2 of the sub-matrix; the wire $1_{21}$ belongs to the line 2 and the column 1 of the sub-matrix; and the wire $1_{22}$ belongs to the line 2 and the column 2 of the sub-matrix.

Otherwise stated, if we associate the four wires by groups of two, two of these wires belong to a first line of the matrix and the other two belong to a second line of the matrix. Similarly, if two of the wires form part of the same column, the other two wires form part of another column.

If the rectifier elements connected in the said exciting wires were not present, the wire $1_{11}$ for example, would of course be excited, but the current circulating in this wire could also take, among others, the possible path *f, g, h, i, j, k, l, e*.

It should be noted that it is more convenient to utilize two rectifier elements for each exciting wire than two transistors or one symmetrical transistor, which is not fast enough or symmetrical enough, with respect to the output furnished.

The necessity for employing two rectifier elements is further largely compensated for, by the possibility of arranging a number of words or a large number of digits on the same exciting wire.

It will be recalled that the signals indicating the proper operation of the reading sub-matrix are transmitted to the circuit 93 (FIG. 9) by the emitter of transistor $728_1$ and the wire 123 (FIGS. 14 and 17). For the reinscription sub-matrix, the same types of signals are sent to the circuit 93 by the emitter of transistor $728_2$ and the wire 125.

With respect to the dimensions of the sub-matrices, it should be noted that these do not depend upon the dimensions of the ferrite plates. For reasons of convenience in manufacture, the ferrite plates are made small so as to form matrices of 20 by 20 holes for example. It is always possible to connect in series, the reading wires of several plates belonging to different pile-ups. It is thus possible, by the proper connection of the exciting wires to the sub-matrices, to obtain the equivalent of a single pile-up with a larger number of exciting wires. This provides the equivalent of large plates corresponding to matrices of 125 by 125 holes for example. In like manner, the selection matrix, which should be of the same capacity, is broken up into sub-matrices of medium size.

Subsequently, in the description of FIGS. 24 and 25, explanations will be given for selections in four dimensions which permits the ready juxtaposition of standard sub-matrix building blocks, in order to obtain the equivalent of a selection matrix with a capacity which is variable, and is as large as possible. The maximum size of a sub-matrix is limited by the gradient time required for the impulses transmitted over the exciting wires.

A detailed description will now be given of the devices required for the operations of reading, reinscription and writing (rectangle 13 in FIG. 6).

In FIG. 10, this rectangle 13 is shown in more detail. It appears as composed of a series of identical circuits 81, 82. Each of these circuits is formed by the association of four types of sub-assemblies such as $81_1$, $81_2$, $81_3$, $81_4$.

FIG. 19 is a schematic diagram for the subassemblies $81_1$ and $81_2$.

The sub-assembly $81_1$ is a reading preamplifier for a same group of pairs of plates. There may be several preamplifiers connected in parallel to the sub-assembly $81_2$, which contains the common equipment for reading and writing, corresponding for example to the first digit of the words of the category number 1.

FIG. 20 is a schematic of the sub-assemblies $81_3$ and $81_4$. The sub-assembly $81_4$ includes two inhibition sources, one source for each polarity. There may be several sub-assemblies $81_4$ connected in parallel to the output terminals of the sub-assembly $81_3$, which contains the common equipment for reinscription associated with the sub-assembly $81_2$.

The sub-assemblies $81_1$ and $81_4$ each include a transformer. The primary of the input transformer for the circuit $81_1$ is connected in parallel with the secondary of the output transformer of the circuit $81_4$. The extremities of these windings are connected to the extremities 7 and 8 (FIG. 7) of the reading and inhibition wire 4 of a pair of ferrite plates. It will be understood that the term "pair of plates" is intended to mean a fictitious pair of plates formed by the juxtaposition of several pairs of actual plates, as has already been described.

The transformer 701 (FIG. 19), the terminals $80_1$ and $80_2$ of which form the input terminals of the reading preamplifier $81_1$ has a secondary with a middle point at zero potential. This secondary is connected to the bases of transistors 1130 and 1131. These transistors amplify a predetermined polarity of the reading signal. The transistor 1130 is responsive only to the digit 0 while the transistor 1131 is responsive only to the digit 1.

Actually, the variation of potential appears, at the moment of reading, on one or the other of these transistors only if the transistor 1105 (time base, FIG. 13) is unblocked. The wire 109 (FIGS. 10, 13 and 19) then retransmits the unblocking signal for the reading amplifiers coming from the time bases. The size of the fictitious pair of plates serving the reading preamplifier $81_1$ is limited so that the reading signal will be properly distinguishable from the background noise existing in the reading wire.

The terminals $80_3$ and $80_4$ of the secondary winding of transformer 702 (FIG. 20) constitute the output terminals of two inhibition sources of the sub-assembly $81_4$, one source for each polarity. The primary of transformer 702 is connected to the collector of transistors 1155 and 1157, which furnish the inhibition current for reinscription of the digits 0 and 1 respectively.

The middle point of the primary of transformer 702 is connected by the intermediary of a potentiometer device to the base of transistor 1156.

Each time that one of the transistors 1155 and 1157 pass current, transistor 1156 in series with its equivalents in the other circuits (FIG. 10) is unblocked, and a negative impulse passes over the wire 147 to signal the proper operation of all of the inhibition sources.

One pair of sources of inhibition current can serve only a limited number of pairs of plates, as in the case described above. The larger the number of pairs of plates, the longer must be the gradient time for the inhibition current impulse. The length of this gradient depends primarily on the impedance of the cabling, because during the reinscription in the fictitious pairs of plates under consideration, a single hole is reversed, whereas on the exciting wire half of the holes are reversed.

It is desirable however, that each reading preamplifier sub-assembly and each inhibition source serve the greatest number of holes possible. The ascent time of an inhibition impulse is, under these conditions, considerably longer than the ascent time of the impulse in the exciting wire.

In the operation of re-inscription, which was described in connection with FIG. 5, and which consists of producing in the exciting wire a first impulse 3111, and a second impulse 3112 of an amplitude equal to the first but of opposite polarity, it is necessary, if the inhibition impulse is to function properly, that its amplitude be approximately equal in absolute value to half of that of the two preceding impulses. This impulse is shown at 3113. The operation which has just been reviewed is also that which takes place in the case of memories of the parallel type employing a single ferrite core for each binary digit, except that the inhibition current always has the same polarity and that it exists or does not exist, according to the digit to be described.

According to the invention, the second impulse transmitted over the reading wire on the one hand, and the inhibition impulse on the other hand, have amplitudes equal respectively to ¾ and to ¼ of the first impulse. This second impulse and this inhibition impulse are shown at $3112_a$ and $3113_a$, FIG. 5, lines *a* and *b*. If they are in synchronism, the accumulated effect is sufficient to produce reversal of the hole involved. In the opposite case, there is no reversal.

These arrangements permit the utilization of magnetic materials the hysteresis cycle of which does not present highly rectangular characteristics, and which would not have been suitable for the re-inscription operations of the prior art. This results from the fact that the inhibition impulse of the invention, being of lesser amplitude produces a reduced disturbing effect also in the other holes traversed by the reading wire, and which are not involved in the re-inscription being effected.

These arrangements also result in reducing the effect of the parasitic impedances presented by the cabling. It follows that a single inhibition source can serve most holes without requiring an excessive extension of the ascent time.

On the other hand, for the inhibition pulse to be adequate, it is necessary that its duration be at least as great as that of the second impulse in the exciting wire. A time margin should, therefore, be reserved between the reading and the re-inscription. In FIG. 5, line *c*, this margin time is assumed to be equal to .5 microsecond.

The inhibition time base included in the time bases (FIG. 13) transmits a control signal over the wire 111 (FIGS. 13 and 20), which starts immediately after the reading (dotted line impulse of FIG. 5, line *b*). This results in the real profile of the inhibition impulse being in accordance with that shown in solid lines in FIG. 5, line *b*.

In the case of the juxtaposition of a certain number of standard pile-ups, the reading preamplification units and the inhibition source units corresponding to the pairs of plates of the same number in each pile-up, are arranged in parallel. The reading signals from the preamplifiers $81_1$ (FIGS. 10 and 19) are extended to the wires 141 and 142, which are multipled to each preamplifier. From there, these signals are re-transmitted to the common reading unit $81_2$.

In like manner, the inhibition control signals come from the common re-inscription unit $81_3$ (FIGS 10 and 20) via the two wires 146 and 148, which are multipled to each of the inhibition sources such as $81_4$. The signaling wire 147 on the other hand, traverses all of the units $81_4$ before returning to the unit $81_3$.

As is now apparent, the common reading unit $81_2$ and the common re-inscription unit $81_4$ serve both of the pairs of plates of the same number in the juxtaposed standard pile-ups. Such an arrangement thus permits the juxtaposition of standard pile-ups in any desired number, and to obtain in this manner, if necessary, a memory of a very large capacity.

All of the logical functions provided by the common reading unit $81_2$ and the common re-inscription unit $81_4$ necessitate the use of numerous transistors. However, for a memory of large capacity, the number of these transistors is reasonable; for practical purposes it is reduced for each pair of plates of a standard pile-up, to the 5 transistors of the sub-assemblies $81_1$ and $81_4$ which have just been described.

With respect to the common reading and re-inscription units $81_2$ and $81_4$, it will be recalled that there are as many of these units as there are digits on an exciting wire. These units are arranged in groups, and one group corresponds to the words of a single category.

A common unit for reading and writing will now be described (unit $81_2$, FIG. 10). This unit, which is taken as an example, corresponds to the first digit of the words in the category 1.

The reading signal corresponding to the digit 0 is received over the wire 141, amplified by the transistor 1132, and transmitted by means of the transistor 1134 and wire 127 to the central reading unit (FIG. 19) which will now be described.

The transistor 1134 can be unblocked only by a signal of a certain polarity coming from the central reading unit over the wire 129. The unblocking signal is applied during the reading time to all of the common reading units of the same category, the wire 129 being multipled over all of these common units. In this manner the central reading unit receives only the reading signals corresponding to the chosen category.

A potential of the proper polarity having been applied to the wire 130 during the reading, the reading signal coming from the transistor 1132 is at the same time transferred to the common re-inscription unit $81_3$ (FIG. 20) by way of the transistor 1138, transistor 1142 and the wire 143. This transfer occurs whether or not the unit belongs to the category of the word selected.

For writing the same digit 0, the reading signal is not sent to the central unit, and no unblocking signal is received over the wire 129.

In the same manner, the reading signal, still in the case of the writing of the digit 0, is not transferred to the common re-inscription unit, because the transistor 1138 is blocked by means of the wire 130 during the reading time.

On the other hand, during the reading time, wire 131 transmits a signal coming from the central reading unit. This signal permits the unblocking of transistor 1140 when there also arrives, on the writing wire 102, a negative impulse having a duration equal to 3 microseconds. Under these conditions a positive impulse, replacing the reading impulse, is sent to the transistor 1142 during the reading time. This positive impulse is thus transmitted over the wire 143 to the common reinscription unit $81_3$ (FIG. 20). The wire 131, as well as the wire 130, is multipled all over all of the sub-assemblies $81_2$ of the same category. This causes the writing to be made only in the category selected by the central unit.

In the sub-assemblies $81_2$ of the other categories the reinscription is effected in normal manner, the corresponding transistors 1138 in these sub-assemblies being unblocked.

For reading, reinscription, or writing of the digit 1, the operations are identical with those just described. The equivalents of transistors 1132, 1134, 1138, 1140, 1142, are respectively the transistors 1133, 1135, 1139, 1141, and 1143. The equivalents of the wires 141, 143, 127, 129, 130, 131, 132, are respectively the wires 142, 145, 128, 129, 130, 131, and 133.

We will now describe the manner in which the error signals are produced.

Because of the negative polarity applied to the base of transistor 1144 through a resistance type potentiometer, this transistor is unblocked. However, this unblocking can be effected only during the reading time, when the reading signal from the reading signal time base arrives over the wire 108, after being retarded .3 microsecond from the unblocking time of the reading pre-amplifiers.

Actually, the reading signal arrives simultaneously, via the transistor 1136 (digit 0), or via the transistor 1137 (digit 1). This is a positive impulse which, applied to the base of transistor 1144, causes the latter to be blocked.

This positive impulse acts with a certain delay due to the initiation of the reversal, and to delays in transmission. It is for this reason that the time base of the reading signal arriving over the wire 108 is delayed by .3 microsecond.

On the other hand, the transistors 1136, 1137 are regulated in such a way as to have a storage time of at least .3 microsecond, so that the positive impulses applied to the base of transistor 1144 be sufficiently extended to cause a positive blocking action. If for any reason, the reading signal does not reach the transistor 1144, the latter initiates, at the start of the reading period, a positive impulse which unblocks the transistors 1145 and 1146.

Transistor 1145 then transmits a reading error signal to the error signal unit over the wire 134, which is multipled on all of the units $81_2$. Transistor 1146 excites a ferrite core 1302 having a rectangular hysteresis signal, and magnetizes it in the direction corresponding to the recording of the error.

The common re-inscription unit $81_3$, the detailed schematic of which is indicated in FIG. 20, will now be described. It will be recalled that for this unit, there is no difference between a writing and a re-inscription. By way of example, the operation of re-inscription in the case of the digit 0 will be described.

The reading signal, amplified as to the current by the transistor 1142 of the unit $81_2$ (FIG. 19, common reading unit) is further amplified in the unit $81_3$ (FIG. 20) by the transistors 1148 and 1149.

The transistor 1142 is regulated in such a way as to have a storage time of 1.5 microseconds approximately. There may also be inserted in the connection wire 143 a delay line having a delay time slightly less than 1 microsecond. The objective sought is to have the negative signal applied to the base of transistor 1148 persist at least for the duration of the inhibition control signal arriving over the wire 111 from the time base unit. This signal is shown in dotted lines in FIG. 5, line *b*.

This inhibition control signal is finally transmitted via the wire 146 to the transistor 1155 of the various associated blocks $81_4$ (inhibition sources).

For the reinscription of the digit 1, the procedure is the same. The equivalents of transistors 1148 and 1149 are respectively transistors 1150 and 1151. The equivalents of the wires 143 and 146 are respectively the wires 145 and 148.

With respect to the signalization of the errors of re-inscription coming either from the inhibition sources, or from the transfer circuit between the common reading unit and the common reinscription unit, the operation is as follows.

A potential of positive polarity is permanently applied to the bases of transistors 1153 and 1154. These transistors are unblocked only when the re-inscription control signal (FIG. 5, line *a*) arrives from the time base unit over the wire 112. The transistors 1153 and 1154 are, therefore, unblocked during a time inferior to the duration of the inhibition control signal arriving over the wire 111.

If all of the inhibition source circuits $81_4$ operate properly, all of the associated transistors 1156 are unblocked, and a negative impulse transmitted over the wire 147 to the bases of transistors 1153 and 1154 prevents these latter from being unblocked.

If on the contrary, an inhibition source $81_4$ does not operate, the corresponding transistor 1156 is not unblocked, and there is no production of a variation of potential in the wire 147. The transistors 1153 and 1154 are, therefore, unblocked.

The transistor 1153 magnetizes the ferrite core 1302 (FIG. 19) in the desired direction over the wire 144. The transistor 1154 then sends the signal for this inhibition fault to the fault signal unit, over the wire 149.

We will now describe a central unit for reading, writing and the selection of the word category. It is shown at 70 and 71 in FIG. 10. The detailed schematic is shown in FIG. 21.

The central unit for reading, writing and the selection of the word category provides the connection between the computer and the various units described above. It will be recalled that the computer selects a category of words, and controls the operations of reading and writing.

In the first place, it will be shown how the operation of selecting the word category is effected, in considering first the operation of reading. During the access time of about 3 microseconds, the computer sends a negative impulse to the base of transistor 1161 over the wire 151.

The unblocking signal for the reading pre-amplifiers (FIGS. 10, 19, and 21) which arrives from the time base unit over the wire 109, is then re-transmitted by the transistor 1161 to the transistors 1158 and 2102 of the rectangle $P_1$, and to the equivalent transistors of the equivalent rectangles $P_M$. The rectangles $P_1, P_2, \ldots P_M, \ldots$ are respectively associated with the selection of the words of the category $1, 2, \ldots M, \ldots$ The transistor 2102 (rectangle $P_1$), the base of which is polarized negatively, is then unblocked, and the unblocking signal for reading is then transmitted to the transistors 1138 and 1139 (FIG. 19, common units for reading in the category 1) by way of wire $130_1$, which is multiplied to the said common reading units for the word category number 1.

The same thing applies to the other rectangles $P_M$. In this manner the transfer of the reading signals to the re-inscription sources is assured for all of the categories $1, 2, \ldots M \ldots$ On the other hand, for a category not chosen, the transistor 1158 remains blocked, its base being substantially at zero potential. In consequence, no reading signal for this category is transmitted to the central reading unit.

For the category 1 which is assumed to be chosen, a positive selection impulse with a duration of three microseconds arrives from the computer over the wire $150_1$ on the base of the transistor 1160. This unblocks the latter, which in turn unblocks transistor 1158. The unblocking signal for reading is then retransmitted over the wire $129_1$ to transistors 1134 and 1135 (FIGS. 10 and 19) of each of the common reading units for the category 1. The wire $129_1$ is multiplied to all these units. The reading signals for the category 1 are then retransmitted to the central reading unit.

The operation of selecting the word category in the case of writing will now be described.

During the access time of three microseconds, in the case of writing the computer transmits a negative impulse called a writing control pulse over the wire 152 (FIG. 21). This negative impulse unblocks transistor 1162, which then retransmits the reading unblocking signal to transistors 1159 and 2101 over the wire 109.

For a category not chosen, the transistor 2101, the base of which is polarized negatively, is then unblocked.

In consequence, the unblocking signal is transmitted to the common reading devices for the category M (FIG. 19), over the wire $130_M$.

For the categories not chosen, the reading signals are therefore always transferred to the inhibition sources for reinscription.

For the chosen category (category 1, for example), the selection signal for the category 1 on arriving, as previously stated, over the wire $150_1$, unblocks transistors 1160, and also 1159, which then transmits the reading unblocking signal via wire $131_1$ to transistors 1140 and 1141 (FIG. 19) of each of the common reading devices for the category 1. The wire $131_1$ is multiplied over all of these devices.

The two transistors 1140 and 1141, which serve for writing, retransmit, therefore, at the moment of reading, the writing signals arriving upon their bases over the wire 132 (digit 0) and the wire 133 (digit 1) respectively. At the same time the selection signal for the category 1 blocks transistor 2101. Consequently, unlike the other categories, the transfer of the reading signals to the reinscription unit does not occur, in order not to interfere with the writing signals.

Furthermore, no reading signal is retransmitted to the central reading unit, the transistors 1158 in each of the rectangles $P_M$ not being unblocked, since the transistor 1161 is not unblocked. This transistor prevents the operation of transistor 2102.

The group 71 (FIGS. 10 and 21) is concerned with the operations of writing and reading which will now be described.

The rectangles $Q_1$, $Q_2$, . . . $Q_{20}$ constituting the group 71 correspond to the first, second, . . . twentieth, digits respectively of each word. The reading and writing operation for the first digit of each word (rectangle $Q_1$) will be discussed first.

The common reading group $81_2$ corresponding to the first digit of the chosen category, sends reading signals to the central reading unit (rectangle $Q_1$) over the wire $127_1$ for the digit 0, and over the wire $128_1$ for the digit 1. The digit 0 is retransmitted to the computer by transistor 1163 and wire $153_1$. The digit 1 is retransmitted to the computer by the transistor 1164 and the wire $154_1$.

In like manner, the positive writing signals coming from the computer via wire $155_1$ for the digit 0, and via wire $156_1$ for the digit 1, are respectively retransmitted to the common reading unit $81_2$ by the transistor 1166 and wire $132_1$, and by the transistor 1165 and wire $133_1$.

The wires $127_1$, $128_1$, $132_1$, $133_1$ are multiplied to all of the common reading units corresponding to the digit 1 of each category. However, only the common reading unit for the category chosen is in communication with the central unit, as previously indicated in connection with the selection of the category.

For words of less than 20 digits, the last rectangles Q of the group $83_2$ are not connected to the corresponding common units for the category.

There will now be given, in connection with FIGS. 22 and 23, a detailed description of the error signaling unit and the blocking control unit represented by the rectangle 14 in FIG. 6. This unit has three functions:

(1) Centralization of the error signals with alarm and memory blocking control;

(2) Retransmission of the b'ocking control coming from the outside (from a supervisory apparatus, for example);

(3) Transmission of the coordinates of the unit of the memory which has failed to a supervisory apparatus.

The first function will be described first of all in the case of an error coming from the reading and reinscription unit (FIGS. 6 and 10).

If an error occurs at the moment of reading, in an amplifier or in the associated common reading unit, it is signaled by the common reading unit over wire 134 (FIGS. 10, 19, and 22) which is multipled to all of the common reading units in the memory.

This error signal reverses the flip-flop constituted by the transistors 1175 and 1176 (rectangle F, FIG. 22). This reversal unblocks transistor 1178 and lights the alarm lamp 1801. The lighting of this lamp therefore indicates a fault in a reading unit. At the same time, the transistor 1177 is unblocked. The battery feed to the collector of this transistor is extended over wire 107, which causes the stoppage of the time base circuits and consequently of the memory.

At the instant of reinscription or writing, an error in an inhibition source, or in the transfer units in the corresponding common reinscription unit, is signaled over the wire 149 of the common reinscription unit (FIGS. 10, 20, and 22). This wire 149 is multiplied to all of the common reinscription units.

The error signal triggers the flip-flop in rectangle G which corresponds to the flip-flop of rectangle F. The lamp 1802 is lighted to signal a fault in the inhibition group. This error signal causes, in addition, the transmission of the blocking signal over wire 107.

For an error in the central unit for reading, writing, and selection of the word category, the fault is signaled in the following manner.

For an error in the word category selection units, several cases may present themselves:

(1) Failure on wire 129 (FIGS. 10 and 19)—the reading signals are not retransmitted to the computer, which takes note of this;

(2) Failure on wire 130—the transfer of the reading signals to the reinscription unit does not occur, and the lamp 1802 lights;

(3) Failure on wire 131—the writing does not take place at the same time as the suppression of the reinscription (if wire 130 is energized), and the lamp 1802 lights.

If it is a question of an error in the retransmission of the reading signals, the computer takes note of this by the suppression of a digit, whereas the memory has sent no signal.

If it is a question of an error in the retransmission in the writing of digits, signal lamp 1802 lights.

Any error in any part of the reading and reinscription unit is therefore signa'ed immediately, and the memory is blocked instantaneously, except in the case of a failure in the central reading unit at the moment of reading. However, in such a case there is no destruction of the stored information.

The case of signaling an error in the selection matrix will now be considered.

The failure of a selection sub-matrix or of its associated control unit is signaled over the wire 119 for reading, and over the wire 120 for reinscription. The wires 119 and 120 are multipled to the control units of the submatrix.

The procedure is then the same as that described in connection wtih the units located in the rectangles F and G. The wire 119 triggers the flip-flop of rectangle H, and the wire 120 triggers the flip-flop of rectangle I. In the rectangles H and I it is necessary to add a transistor 1179 in order to invert the error signals arriving on the wires 119 and 120, since these signals are of negative polarity, whereas the signals arriving on the wires 134 and 149 are of positive polarity.

The lighting of the lamp 1803 indicates an error in a reading sub-matrix or in its control unit. The lighting of the lamp 1804 indicates an error in a reinscription submatrix or in its control unit. The memory blocking control signal is also retransmitted in the same manner as previously described.

An error is signaled in the time base group when one of the errors previously listed appears.

It is also possible to block the memory by means of an external control. In such case a negative potential is applied to the wire 173. This unblocks transistor 1173, which places a negative polarity on wire 107 which blocks the memory.

When the faults signaled by the lighting of lamps 1801, 1802, 1803, or 1804 have been corrected, the flip-flops of the rectangles F, G, H, I are returned to their normal position of rest by means of a negative impulse applied to the wire 174. This impulse unblocks transistor 1174, which has for effect to send a control impulse reversing the flip-flops which had shifted to their working position following the appearance of an error. Lamps 1801, 1802, etc., are extinguished and the memory is unblocked by virtue of the return of wire 107 to zero potential.

The procedure permitting the localization of an error in one of the standard building blocks previously referred to will now be described. The case of the common and reinscription units (FIG. 19) will first be described.

As stated, the error is recorded by the ferrite 1302 of the common reading unit involved. This core is magnetized in a particular direction. It is part of an alternate chain of ferrite cores and transistors according to a well known arrangement, and commonly called a "shift register."

To facilitate the explanations to follow, there have been shown on FIG. 23:

(1) That part of FIG. 19 relating to the core 1302 and the associated transistor 1147 (rectangle $B_3$);

(2) That part of the FIG. 22, not yet described, relating to the error signaling unit (rectangle E);

(3) The equivalent circuits for other common reading units (rectangles $B_1$, $B_2$, . . . not shown on FIGS. 19 and 20).

The error signaling unit (rectangle E) feeds the primary winding of the ferrite core $1302_1$ (rectangle $B_1$, common unit 1), and the primary winding of the ferrite core $1302_3$ (rectangle $B_3$ common unit 3), etc., via the transistor 1167 and wire 157.

This same unit feeds the primary winding of the ferrite core $1302_2$ and the primary winding of the ferrite core $1302_4$ (not shown in FIG. 23) . . . and the primary winding of the ferrite core 1303 in the error signaling unit (rectangle E), via the transistor 1168 and the wire 160.

It is now clear that all of the common reading units for all word categories are connected in series by means of the primary windings of their cores. The primary windings for the odd numbered common units are fed by the transistor 1167, while the primary windings of the even numbered common units are fed by the transistor 1168.

At the beginning of the operation of the memory system of the invention, the errors have not yet appeared, and all of the ferrite cores $1302_1$, $1302_2$, . . . 1303 are in the normal state of rest.

When an error appears in the equipment associated with core $1302_3$ (rectangle $B_3$), for example, this core shifts to the working state by virtue of the excitation of transistor 1146 (FIG. 19) or of transistor 1153 (FIG. 20), over wire 144.

If transistor 1167 (rectangle E, FIG. 23) is unblocked, it delivers an exciting impulse. The core $1302_3$ reverses itself, returns to its normal state of rest, and unblocks the transistor $1147_3$ which is associated with it. Only the core $1302_3$ of the chain reverses itself, the other cores being already in a state of rest. The transistor $1147_3$, by virtue of being unblocked, excites the core $1302_4$ (not shown in FIG. 23) over the wires 139 and 140, and this core shifts to its working position. If at this time transistor 1168 (rectangle E) is unblocked, the latter transmits an impulse which causes tthe core $1302_4$ to return to its state of rest, which excites its associated transistor $1147_4$.

Thus, by the alternative unblocking of transistors 1167 and 1168, the core 1303 finally reverses itself, which causes the unblocking of the transistor 1169 and, in consequence, the transmission of a positive impulse over the wire 166.

If the number of unblocking impulses required to be sent alternatively to the transistors 1167 and 1168 to obtain an impulse on the wire 166 is known, it is immediately apparent that it is the core of the rectangle $B_1$ which has recorded an error.

After the error-hunting tests, all of the cores 1302, as wall as the core 1303, return to the state of rest.

In FIG. 22 where the circuits contained in the rectangle E are also shown, there are indicated the wires 164 and 165 over which arrive the odd and even impulses coming from the supervisory unit, and which unblock respectively the transistors 1167 and 1168. This supervisory equipment counts the total number of impulses sent before receiving an impulse over the wire 166, which enables it to recognize the identity of the unit which has failed.

It should be noted that the transistors 1167 and 1168 can operate only if the switch 1901 (FIG. 22) is closed. This closure is effected manually by the operator as soon as the lamp 1801 or 1802 lights. If on the other hand it is one of the lamps 1803 and 1804 which lights, the operator closes the switch 1902 (rectangle E') in order to reveal in the same manner the identity of a selection sub-matrix which has failed.

The circuits contained in the rectangle E' are the exact equivalents of those contained in the rectangle E.

The circuit elements 1302 and 1147, the wires 135, 136, 137, 138, 139, 140 (FIGS. 19 and 23) of a common reading and reinscription unit have respectively for equivalents the circuit elements 1301, 1117, and the wires 113, 114, 115, 116, 117, 118, (FIG. 14) in a control unit for a selection sub-matrix.

Having described each of the constituent parts of the memory of the invention as well as their operation, we will now return to the general interconnections of the memory. In order to better understand these interconnections, reference should be made to FIGS. 24 and 25 which are symbolic perspective views.

In FIG. 24, the cube 190 represents a pile-up of pairs of plates such as $2_6$ and $5_6$ corresponding to the sixth digit of the corresponding word. Three other similar cubes, designated 191, 192, and 193, identical with cube 190, have identical pairs of plates $2_6$ and $5_6$. A common reading wire 4 passes through all of the holes in these four pairs of plates, and terminates at the terminals 7 and 8, which correspond to those indicated in FIG. 7 under the same reference numbers. These are the input terminals for the reading preamplifier $86_1$ and the reinscription unit $86_4$, for the pairs or plates corresponding to the digit of the word category involved, that is to say, the sixth digit of the first category, in the case of species.

In the other word categories are found similarly, other groups of pairs of plates represented by cubes such as 290 and 390 which are equivalents, for the second and third categories, to the cube 190 of the first category. Each assemblage of pairs of plates corresponding to each digit of each word category is provided with a preamplifier and a reinscription unit, which have not been shown, in order to simplify the drawing.

The equivalent holes in each plate of the pairs of plates for the three word categories are traversed by the same reading wire. There is a cluster of these reading wires, only one of which is shown at 1, leading from the reading sub-matrix 90 to the reinscription sub-matrix 91. These two sub-matrices have been placed symbolically at each extremity of the parallelepipedic grouping formed by the cubes 190, 191, . . . 390.

It will be recalled that the function of an exciting sub-matrix 90 is to feed a particular exciting wire in order to permit the reading of a particular word, and that the reading of this word erases the information stored in the pairs of holes involved. It is clear that the passage of an impulse in the exciting wire produces a reading also in the word categories not involved, as well as the erasure of the information.

The role of a reinscription sub-matrix 91 is to feed the exciting wire which has just provided a reading. In the word categories not involved in the reading which has just been effected, the erased information is reinscribed. In the word category involved, we can, depending on the case, either reinscribe what has been read, or write a new word.

Each preamplifier such as $86_1$, and each reinscription unit such as $86_4$, is controlled by a common reading unit and a common reinscription unit. There may be several preamplifiers controlled from a common reading unit, and several reinscription units controlled by a common reinscription unit.

In FIG. 25 each plate such as 186, represents symbolically a section of FIG. 24 comprising the four pairs of plates of the four cubes 190 to 193, the preamplifier $86_1$ and the associated reinscription unit $86_4$. In the same section there are shown the equivalent plates 286, 386, and 486.

The four assemblies of a same section are controlled by a common reading unit and a common reinscription unit. Thus, for the assemblies 181, 281, 381, 481 corresponding to the first digit, the common reading unit is shown symbolically at $81_2$, and the common reinscription unit at $81_3$.

The assemblage of the reading sub-matrices 90 and the reinscription sub-matrices 91 constitute the memory matrix.

What is claimed is:

1. In a magnetic memory system in which during a cycle a binary digital unit responds to reading excitation current at any of a plurality of addresses by transmitting a signal to a sensing unit, the signal being of first or second polarity corresponding to a binary one or zero respectively, and the absence of a signal at the sensing unit in response to the reading excitation current being indicative of an error; an error-registering storage element associated with said sensing device, a blocking control unit, means responsive to said absence of a signal during a given portion of said cycle for producing a registration in said storage element and for transmitting an error signal to said blocking control unit, and means including said blocking control unit for blocking operation of the memory system responsive to said error signal.

2. In a magnetic memory system according to claim 1 which comprises a plurality of said digital units with individual sensing devices and error-registering storage elements; a shift register which includes said error-registering elements associated with the several digital units, and means for stepping the shift register until it reaches the error-registering element which has registered the error to thereby indicate the location of the corresponding sensing device by the number of steps made.

3. In a magnetic memory system according to claim 1 comprising a plurality of digital units, each having a pair of magnetic storage elements for each address, each address having an individual excitation wire linked to both elements of the pair corresponding to that address in each digital unit, a stored binary digit being represented by the two elements of a pair being in opposite remanent states, the said reading excitation current applied over said excitation winding causing one or the other element of said pair to change state to thereby produce said signal transmitted to the sensing unit.

4. In a magnetic memory system which comprises a plurality of magnetic memory elements and a plurality of units for supplying various excitation currents to the memory elements and for detecting output currents therefrom; an error detecting arrangement comprising error-registering storage elements individually associated with said units, and a shift register which includes said error-registering elements; means responsive to an error in one of said units of said group for producing a registration in its associated error-registering element, and means for stepping the shift register until it reaches the error-registering element of said one unit to thereby indicate the location of said one unit by the number of steps made.

5. In a magnetc memory system according to claim 4, further including at least one bistable device, and means responsive to said error in said one unit for setting said bistable device.

6. In a magnetic memory system according to claim 4, in which said units are divided into groups of different types, with a shift register for each group, each shift register including said error-registering elements associated with the units of its group.

7. In a magnetic memory system according to claim 6, in which each of said groups is divided into sub-groups, further including a bistable device associated with each sub-group, and means responsive to said error in said one unit for setting the bistable device of its sub-group.

8. In a magnetic memory system, the combination as claimed in claim 7, further including means comprising a blocking control unit for blocking operation of the memory system responsive to the setting of any one of said bistable devices.

9. A magnetic memory system comprising a plurality of pairs of planes of magnetic elements, each plane including a plurality of magnetic elements arranged in columns and rows, said planes being arranged parallel to one another and having openings of the elements substantially in register, a plurality of excitation conductors linking all said planes, each conductor passing through one element opening per plane, a selection matrix comprising a reading sub-matrix and a writing sub-matrix, each sub-matrix having a plurality of row transistors individually associated with the rows of excitation wires and a plurality of column transistors individually associated with the columns of excitation wires, each transistor having one of its electrodes connected in multiple to all of its associated excitation wires, the row transistors being all connected to the excitation wires at one end of the memory planes, and the column transistors being all connected to the other end of the excitation wires at the other end of the memory, an individual pair of diodes connected at one end of each excitation conductor, one diode being serially connected between the conductor and a transistor of the reading sub-matrix and the other diode being serially connected between the conductor and a transistor of the writing sub-matrix, all of the transistors and diodes of the reading sub-matrix being poled to pass current through the excitation wires in one direction, and all of the transistors and diodes of the writing sub-matrix being poled to pass current through the excitation conductor in the other direction.

10. A memory system according to claim 9, further including a reading conductor coupling all of the magnetic elements of a pair of planes with the two elements associated with any excitation wire being coupled in opposite directions, means responsive to the selection of a particular address for enabling one row and one column transistor of the reading sub-matrix to pass an excitation current through the corresponding excitation conductor to thereby cause the switching of one element of each pair of planes to thereby produce respective output currents in the reading wires, and means for subsequently enabling the writing sub-matrix row transistor and column transistor associated with the same excitation wire and simultaneously producing an inhibition current in each reading wire so that one element of each pair of planes is switched to store a binary digit in each pair.

11. A magnetic memory system according to claim 10, in which said writing current on said excitation conductor has an amplitude equal to ¾ of the amplitude of said reading current on the excitation conductor, and said inhibition current has an amplitude equal to ¼ of the said reading excitation current.

12. In a magnetic memory system, the combination as claimed in claim 10, in which said pairs of memory planes are divided into groups having their memory elements connected in series along common excitation wires, so that responsive to the application of reading excitation current to one of said excitation conductors all of the pairs of planes will produce output currents to their respective sensing devices, means for transmitting the output signals from only one of said groups of planes to a utilization system, and means effective during said writing excitation current applied to said excitation conductor for controlling the inhibition currents applied to said group of planes in accordance with new information received from said utilization system, and for rewriting the same binary digits in all of the memory planes of the other groups in accordance with the output signals received during the preceeding reading excitation.

13. In a magnetic memory system, the combination as claimed in claim 12, including a plurality of said selection matrices for controlling the excitation currents in said excitation conductors, said matrices being arranged in a coordinate array and selected by the coincidence of two signals, so that the selection of a particular excitation conductor requires coincidence of four signals, two for selecting the matrix, one for selecting the row of the matrix, and another for selecting the column of the matrix.

14. A magnetic memory system comprising a plurality of pairs of magnetic elements, a first conductor coupled to each element of a pair in the same direction, and a second conductor coupled to each element of a pair in opposite directions, each magnetic element having two remanent magnetic states, a binary digit stored in a pair of elements being represented by one element being in one state and the other element being in the other state; means for passing a reading excitation current of a given amplitude to said first conductor to thereby switch one element of the pair, and means for subsequently passing a writing excitation current through said first conductor coincident with an inhibition current through said second conductor, the writing excitation current having a value substantially less than said given value, and said inhibition current having a value substantially less than half of said given value, so that in one element the fluxes are aiding to thereby switch that element, and in the other element the fluxes are in opposition so that the element is not switched.

15. A magnetic memory system according to claim 14, in which said writing current in said first conductor has a value equal to about three-fourths of said given value, and said inhibition current in said second conductor has a value equal to about one-fourth of said given value.

References Cited in the file of this patent

UNITED STATES PATENTS

| | | |
|---|---|---|
| 2,902,678 | Kosonocky | Sept. 1, 1959 |
| 2,904,781 | Katz | Sept. 15, 1959 |
| 2,912,677 | Ashenhurst | Nov. 10, 1959 |